(12) United States Patent
Bae et al.

(10) Patent No.: US 8,968,842 B2
(45) Date of Patent: Mar. 3, 2015

(54) LIQUID CRYSTAL DISPLAY DEVICE AND METHOD OF MANUFACTURING THE SAME

(71) Applicant: Samsung Display Co., Ltd., Yongin, Gyeonggi-Do (KR)

(72) Inventors: Jihong Bae, Yongin-si (KR); Kyungmin Kim, Seoul (KR); Min-Jae Kim, Gyeonggi-do (KR); Min-Hee Kim, Ansan-si (KR); Euna Kim, Seoul (KR); Joon-Hyung Park, Seoul (KR); Keunchan Oh, Cheonan-si (KR); Jinhyeong Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/904,449

(22) Filed: May 29, 2013

(65) Prior Publication Data

US 2014/0204329 A1   Jul. 24, 2014

(30) Foreign Application Priority Data

Jan. 24, 2013   (KR) ........................ 10-2013-0008170

(51) Int. Cl.
| | | |
|---|---|---|
| *C09K 19/00* | (2006.01) | |
| *C09K 19/02* | (2006.01) | |
| *H01J 9/00* | (2006.01) | |
| *H01J 9/24* | (2006.01) | |
| *G02F 1/1337* | (2006.01) | |
| *C09K 19/52* | (2006.01) | |
| *C09K 19/12* | (2006.01) | |
| *C09K 19/30* | (2006.01) | |

(52) U.S. Cl.
CPC .......... *G02F 1/133788* (2013.01); *C09K 19/52* (2013.01); *G02F 1/133711* (2013.01); *C09K 2019/122* (2013.01); *C09K 2019/123* (2013.01); *C09K 2019/124* (2013.01); *C09K 2019/3004* (2013.01); *C09K 2019/301* (2013.01); *C09K 2019/3016* (2013.01); *G02F 2001/133726* (2013.01)

USPC ............ 428/1.3; 428/1.1; 349/167; 349/182; 445/24

(58) Field of Classification Search
USPC ................ 349/167, 182; 428/1.1, 1.3; 445/24
See application file for complete search history.

(56) References Cited

U.S. PATENT DOCUMENTS

| | | | |
|---|---|---|---|
| 7,714,977 B2 * | 5/2010 | Hotaka et al. ................. | 349/182 |
| 7,767,280 B2 | 8/2010 | Klasen-Memmer et al. | |
| 7,803,434 B2 | 9/2010 | Kojima et al. | |
| 7,854,970 B2 | 12/2010 | Klasen-Memmer et al. | |
| 7,871,540 B2 | 1/2011 | Yamazaki et al. | |
| 2008/0167482 A1 | 7/2008 | Farrand et al. | |
| 2008/0318833 A1 | 12/2008 | Jermann et al. | |
| 2009/0059132 A1 | 3/2009 | Yamamoto et al. | |
| 2009/0103011 A1 | 4/2009 | Bernatz et al. | |
| 2009/0309066 A1 | 12/2009 | Klasen-Memmer et al. | |
| 2010/0222471 A1 | 9/2010 | Lorenzetti et al. | |
| 2010/0272925 A1 | 10/2010 | Goetz et al. | |
| 2010/0309423 A1 | 12/2010 | Bernatz et al. | |
| 2011/0301360 A1 | 12/2011 | Lietzau et al. | |
| 2012/0099039 A1 | 4/2012 | Haseba et al. | |
| 2012/0292569 A1 * | 11/2012 | Kurisawa et al. ........ | 252/299.63 |

FOREIGN PATENT DOCUMENTS

| | | |
|---|---|---|
| JP | 2009-029929 A | 2/2009 |
| JP | 2009-062513 A | 3/2009 |
| KR | 1020060091257 A | 8/2006 |
| KR | 1020120059384 A | 6/2012 |

* cited by examiner

Primary Examiner — Geraldina Visconti
(74) Attorney, Agent, or Firm — Cantor Colburn LLP

(57) ABSTRACT

A liquid crystal display device includes a first substrate, a second substrate facing the first substrate, and a liquid crystal layer between the first and second substrates. The liquid crystal layer includes a liquid crystal composition including an alkenyl liquid crystal and an antioxidant component including at least one selected from an antioxidant and a derivative thereof. In an embodiment, the antioxidant component is present in an amount of greater than 0 ppm and equal to or less than about 10,000 ppm relative to the total weight of the liquid crystal composition.

18 Claims, 16 Drawing Sheets

LIQUID CRYSTAL DISPLAY DEVICE AND METHOD OF MANUFACTURING THE SAME

This application claims priority to Korean Patent Application No. 10-2013-0008170, filed on Jan. 24, 2013, and all the benefits accruing therefrom under 35 U.S.C. §119, the content of which in its entirety is herein incorporated by reference.

BACKGROUND

1. Field of Disclosure

The present application relates to a liquid crystal display device having a higher voltage holding ratio and fewer defects. The present application also relates to a method of manufacturing such a liquid crystal display device.

2. Description of the Related Art

In general, a liquid crystal display can be classified into a twisted nematic type liquid crystal display, a horizontal electric field type liquid crystal display, and a vertical electric field type liquid crystal display, etc.

In the vertical electric field type liquid crystal display, liquid crystal molecules are aligned in a predetermined direction to allow a long axis of the liquid crystal molecules to be vertical to a substrate thereof when no electric field is applied. Vertical electric field type liquid crystal display can have a wide viewing angle and a high contrast ratio.

The liquid crystal molecules can be aligned in a predetermined direction by a rubbing method or an optical alignment method. In the optical alignment method, reactive mesogens are included in a liquid crystal layer before being cured, and then the reactive mesogens are cured when a light is irradiated thereonto, thereby aligning the liquid crystal molecules. However, some reactive mesogens are not cured and remain after the curing process thus causing an afterimage defect. Accordingly, a display device having improved quality of image is continuously sought.

SUMMARY

The present disclosure provides a liquid crystal display device having high quality images.

The liquid crystal display device includes a first substrate, a second substrate facing the first substrate, and a liquid crystal layer between the first and second substrates. The liquid crystal layer includes a liquid crystal composition including an alkenyl liquid crystal and an antioxidant component including at least one of an antioxidant and a derivative thereof. In an embodiment, the antioxidant component is present in an amount of greater than 0 parts per million ("ppm") and equal to or less than about 10,000 parts per million, relative to the total weight of the liquid crystal composition.

In an embodiment, the alkenyl liquid crystal is present in the liquid crystal composition in an amount of about 20 percent by weight to about 60 percent by weight, relative to the total weight of the liquid crystal composition. The liquid crystal composition further includes an alkoxy liquid crystal in an amount of greater than about 40 percent by weight and equal to or less than about 65 percent by weight, relative to the total weight of the liquid crystal composition and/or a terphenyl liquid crystal in an amount of greater than 0 percent by weight and equal to or less than about 15 percent by weight, relative to the total weight of the liquid crystal composition.

In an embodiment, the alkenyl liquid crystal may include at least one compound selected from

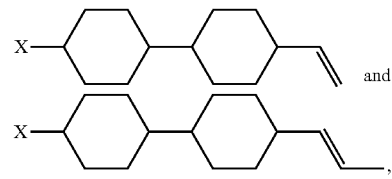

wherein each X is independently an alkyl group having 1 to 5 carbon atoms.

In an embodiment, the alkoxy liquid crystal may include at least one compound selected from

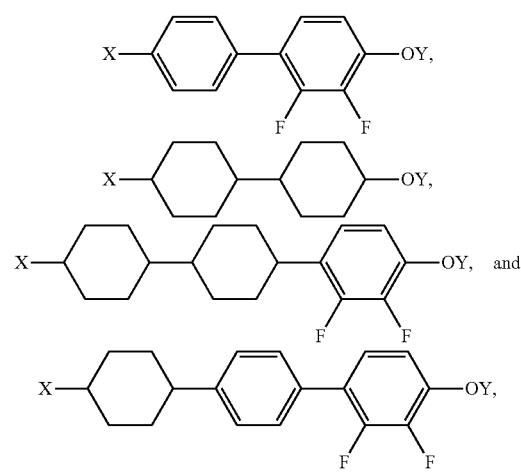

wherein each X and Y is independently an alkyl group having 1 to 5 carbon atoms.

In an embodiment, the terphenyl liquid crystal may include at least one compound represented by

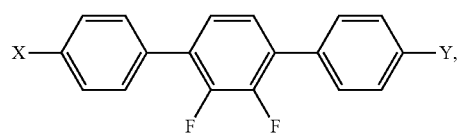

wherein each X and Y is independently an alkyl group having 1 to 5 carbon atoms.

In an embodiment, the antioxidant includes at least one compound selected from an alkylated monophenol, an alkylthiomethylphenol, a hydroquinone, an alkylated hydroquinone, a tocopherol, a hydroxylated thiodiphenyl ether, an alkylidenebisphenol, an O-, N- and S-benzyl compound, a hydroxybenzylated malonate, an aromatic hydroxybenzyl compound, a triazine compound, a benzylphosphonate, an acylaminophenol, an ester of [3-(3,5-di-tert-butyl-4-hydroxyphenyl)propionic acid with a mono- or polyhydric alcohol, an ester of [3-(5-tert-butyl-4-hydroxy-3-methylphenyl) propionic acid with a mono- or polyhydric alcohol, an ester of [3-(3,5-dicyclohexyl-4-hydroxyphenyl)propionic acid with a mono- or polyhydric alcohol, an ester of 3,5-di-tert-butyl-4-hydroxyphenyl acetic acid with a mono- or polyhydric alcohol, an amide of [3-(3,5-di-tert-butyl-4-hydroxyphenyl)propionic acid, ascorbic acid, and an aminic antioxidant.

In an embodiment, the liquid crystal display is manufactured by providing a first substrate, providing a second substrate, disposing a liquid crystal composition between the first and second substrates, the liquid crystal composition including an alkenyl liquid crystal, an antioxidant, and reactive mesogens, and providing light to the liquid crystal composition to form first and second alignment forming layers on the first and second substrates, respectively.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
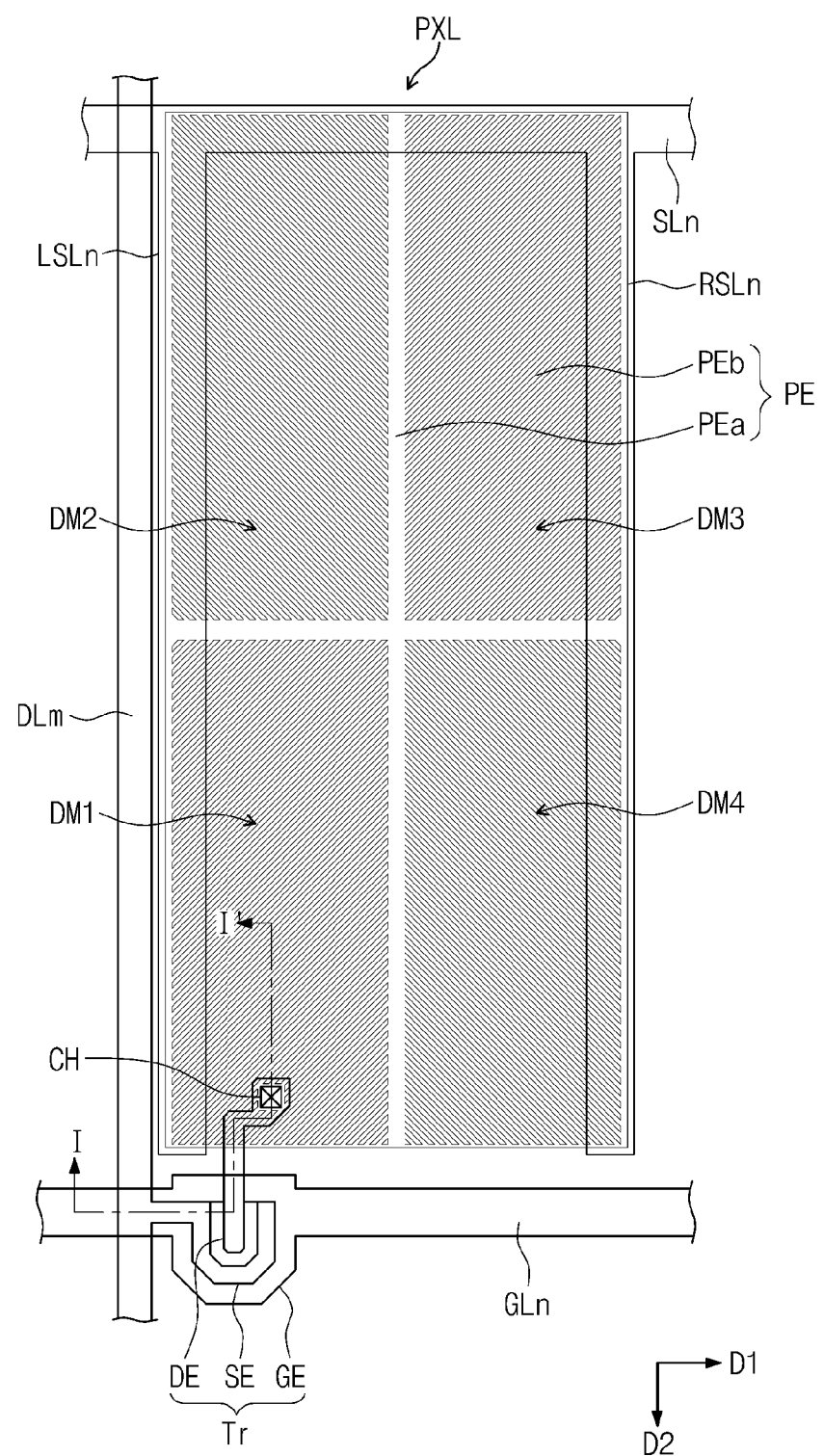
FIG. 1 is a plan view of an exemplary embodiment of a liquid crystal display device comprising a plurality of pixels.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may typically have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "alkyl" means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH$_2$)).

"Alkoxy" means an alkyl group that is linked via an oxygen (i.e., alkyl-O—), for example methoxy, ethoxy, and sec-butyloxy groups and sec-butyloxy groups.

An "alkenyl liquid crystal" is a liquid crystal compound substituted with an alkenyl group.

An "alkoxy liquid crystal" is a liquid crystal compound substituted with an alkoxy group.

Hereinafter, the present disclosure will be explained in detail with reference to the accompanying drawings.

Figure 2:
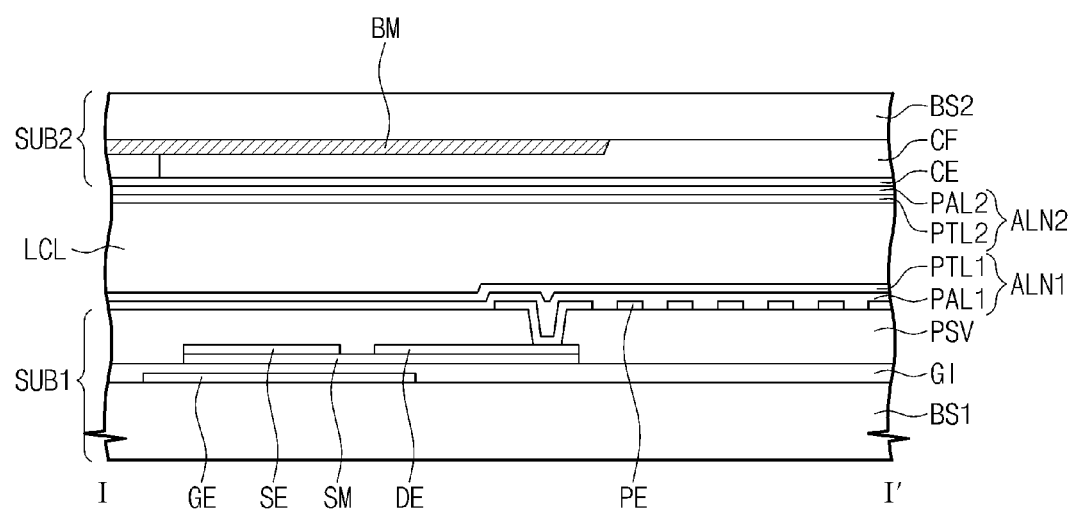
FIG. 2 is a cross-sectional view of the liquid crystal display device of FIG. 1 taken along line I-I'.

FIG. 1 is a plan view of an exemplary embodiment of a liquid crystal display device comprising a plurality of pixels and FIG. 2 is a cross-sectional view of the liquid crystal display device of FIG. 1 taken along line I-I'.

Referring to FIGS. 1 and 2, the liquid crystal display device comprises a first substrate SUB1, a first alignment layer ALN1 disposed on the first substrate SUB1, a second substrate SUB2 facing the first substrate SUB1, a second alignment layer ALN2 disposed on the second substrate SUB2 facing the first substrate SUB1, and a liquid crystal layer LCL disposed between the first alignment layer ALN1 and the second alignment layer ALN2.

The first substrate SUB1 comprises a first base substrate BS1, a plurality of gate lines, a plurality of data lines, and the pixels PXL.

For the convenience of explanation, FIGS. 1 and 2 only show one pixel PXL with an n-th gate line GLn of the gate lines and an m-th gate line DLm of the data lines. However, other pixels have the same structure as the pixel PXL may be present in the liquid crystal display device. Hereinafter, the n-th gate line GLn and the m-th data line DLm will be referred to as a gate line GLn and a data line DLm, respectively.

The first base substrate SUB1 has a rectangular shape and is formed of a transparent insulating material. Other shapes are contemplated.

The gate line GLn is disposed on the first base substrate BS1 and extends in a first direction D1. The data line DLm is disposed on the gate line GLn while interposing a gate insulating layer GI therebetween and extends in a second direction D2 crossing the first direction D1. The gate insulating layer GI is disposed on the entire surface of the first base substrate BS1 to cover the gate line GLn.

The pixel PXL is connected to the gate line GLn and the data line DLm. The pixel PXL includes a thin film transistor Tr, a pixel electrode PE connected to the thin film transistor Tr, and a storage electrode part. The thin film transistor Tr includes a gate electrode GE, the gate insulating layer GI, a semiconductor pattern SM, a source electrode SE, and a drain electrode DE. The storage electrode part includes a storage line SLn and first and second branch electrodes LSLn and RSLn branched from the storage line SLn and extended in the second direction D2.

The gate electrode GE protrudes from the gate line GLn or is provided on a portion of the gate line GLn.

The gate electrode GE may comprise at least one of a metal and metal alloy, e.g., nickel, chromium, molybdenum, aluminum, titanium, copper, tungsten, and an alloy thereof. The gate electrode GE can have a single-layer structure or a multi-layer structure. For instance, the gate electrode GE may have a triple-layer structure of molybdenum-aluminum-molybdenum, a double-layer structure of titanium and copper, or a single-layer structure of an alloy of titanium and copper.

The semiconductor pattern SM is disposed on the gate insulating layer GI. The semiconductor pattern SM may be disposed on the gate electrode GE while interposing the gate insulating layer GI therebetween. The semiconductor pattern SM is partially overlapped with the gate electrode GE. The semiconductor pattern SM includes an active pattern (not shown) disposed on the gate insulating layer GI and an ohmic contact layer (not shown) disposed on the active pattern. The active pattern includes an amorphous silicon thin layer and the ohmic contact layer includes an n+ amorphous silicon layer. The ohmic contact layer allows the source and drain electrodes SE and DE to be in ohmic contact with the active pattern.

The source electrode SE is branched from the data line DLm. The source electrode SE is disposed on the ohmic contact layer and partially overlapped with the gate electrode GE.

The drain electrode DE is spaced apart from the source electrode SE while interposing the semiconductor pattern SM therebetween when viewed in a plan view. The drain electrode DE is disposed on the ohmic contact layer and partially overlapped with the gate electrode GE.

The source electrode SE and the drain electrode DE can comprise at least one of nickel, chromium, molybdenum, aluminum, titanium, copper, tungsten, and an alloy thereof. The source electrode SE and the drain electrode DE can have a single-layer structure or a multi-layer structure of the above-mentioned metal or metal alloys. For instance, the source electrode SE and the drain electrode DE can have a double-layer structure of titanium and copper, which are sequentially stacked, or a single-layer structure of the alloy of titanium and copper.

Accordingly, an upper surface of the active pattern may be exposed through between the source electrode SE and the drain electrode DE, and the active pattern serves as a channel part, e.g., a conductive channel, between the source electrode SE and the drain electrode DE. The source electrode SE and the drain electrode DE may be overlapped with the semiconductor pattern SM except for the channel part between the source electrode SE and the drain electrode DE.

The pixel electrode PE is connected to the drain electrode DE while interposing a protective layer PSV therebetween. The pixel electrode PE is partially overlapped with the storage line SLn and first and second branch electrodes LSLn and RSLn to form a storage capacitor.

The protective layer PSV covers the source electrode SE, the drain electrode DE, the channel part, and the gate insulating layer GI and is provided with a contact hole CH formed therethrough to expose a portion of the drain electrode DE. The protective layer PSV includes at least one selected from silicon nitride and silicon oxide.

The pixel electrode PE is connected to the drain electrode DE through the contact hole CH formed through the protective layer PSV.

The pixel electrode PE includes a trunk portion PEa and a plurality of branch portions PEb extended from the trunk portion in a radial form. The trunk portion PEa or a part of the branch portions PEb is connected to the drain electrode DE through the contact hole CH.

The trunk portion PEa may have various shapes. As an example, the trunk portion PEa has a cross shape as shown in FIG. 1. In this case, the pixel PXL is divided into a plurality of domains by the trunk portion Pea, and the branch portions PEb are extended in different directions according to the domains. In the present exemplary embodiment, the pixel PXL includes first, second, third, and fourth domains DM1, DM2, DM3, and DM4. The branch portions PEb can be extended substantially in parallel to each other and spaced apart from each other in each domain.

The branch portions PEb, which are adjacent to each other, are spaced apart from each other in terms of micrometer. This is to align liquid crystal molecules of the liquid crystal layer LCL to a specific azimuth on a plane parallel to the first base substrate BS 1.

The pixel electrode PE comprises a transparent conductive material. Particularly, the pixel electrode PE comprises a transparent conductive oxide, e.g., at least one selected from indium tin oxide (ITO), indium zinc oxide (IZO), and indium tin zinc oxide (ITZO)

The first alignment layer ALN1 is disposed on the pixel electrode PE to pretilt liquid crystal molecules of the liquid crystal layer LCL.

The first alignment layer ALN1 includes a first initial alignment layer PAL1 disposed on the pixel electrode PE and a first alignment forming layer PTL1 disposed on the first initial alignment layer PAL1.

The first initial alignment layer PAL1 includes a polymer, for example, at least one of a polyimide and a polyamic acid. The first initial alignment layer PAL1 may be pretilted by rubbing or through a photo-alignment scheme.

The first alignment forming layer PTL1 includes a polymerized reactive mesogen which substantially allows liquid crystal molecules to be pretilted in the first alignment layer ALN1.

The term "reactive mesogen(s)" as used herein means a photocrosslinkable low molecular weight copolymer or a high molecular weight copolymer which may be further polymerized. The reactive mesogens may include a group comprising at least one selected from an acrylate group, a methacrylate group, an epoxy group, an oxetane group, a vinylether group, a styrene group, and a thiolene group. The functional group can be partially crosslinked by the polymerization reaction to pretilt the liquid crystal molecules at a predetermined tilt angle with respect to a surface of the first or second substrate.

In an embodiment, the reactive mesogens may include at least one of an alkylated vinyl group having an aliphatic alkyl group with a carbon number of 1 to 18 and an alkylated cinnamoyl group having an aliphatic alkyl group with a carbon number of 1 to 18.

As an example, the functional group may be at least one of

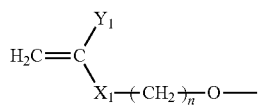

wherein n is 1 to 18, $X_1$ is an alkyl group, an ether group —O—, or an ester group —COO—, $Y_1$ is a methyl group or hydrogen and

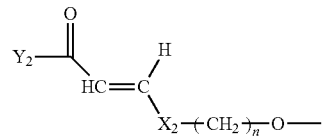

wherein n is 1 to 18, $X_2$ is a methyl group, an ether group —O—, an ester group —COO—, a phenyl group, a cyclohexyl group, or a phenylester group, $Y_2$ is an alkyl group with a carbon number of 1 to 18, a phenyl group, a biphenyl group, a cyclohexyl group, a bicyclohexyl group, or a phenylcyclohexyl group.

The first initial alignment layer PAL1 and the first alignment forming layer PTL1 include a plurality of areas corresponding to the first to fourth domains DM1 to DM4 of the pixel electrode PE. In the present exemplary embodiment, the first initial alignment layer PAL1 and the first alignment forming layer PTL1 include first to fourth areas, and the liquid crystal molecules are aligned in different directions according to the first to fourth domains DM1 to DM4 corresponding to the first to fourth areas.

The second substrate SUB2 includes a second base substrate BS2, a color filter CF, and a black matrix BM.

The color filter CF is disposed on the second base substrate BS2 to assign a color to the light passing through the liquid crystal layer LCL. In the present exemplary embodiment, the color filter CF is disposed on the second substrate SUB2, but it should not be limited to the second substrate SUB2. That is, the color filter CF may be disposed on the first substrate SUB1 rather than the second substrate SUB2.

The black matrix BM is disposed to correspond to a light blocking area of the first substrate SUB 1. The light blocking area includes the data line DLm, the thin film transistor Tr, and the gate line GLn disposed therein. Since the pixel electrode PE is not formed in the light blocking area, the liquid crystal molecules are not aligned, and accordingly a light leakage occurs. Thus, the black matrix BM is disposed in the light blocking area to block the light leakage.

The common electrode CE is disposed on the color filter CF and forms an electric field in cooperation with the pixel electrode PE to drive the liquid crystal layer LCL. The common electrode CE comprises a transparent conductive material. In detail, the common electrode CE comprises at least one conductive metal oxide, such as indium tin oxide, indium zinc oxide, indium tin zinc oxide.

The second alignment layer ALN2 is disposed on the common electrode CE to pretilt the liquid crystal molecules of the liquid crystal layer LCL.

The second alignment layer ALN2 includes a second initial alignment layer PAL2 disposed on the common electrode CE and a second alignment forming layer PTL2 disposed on the second initial alignment layer PAL2.

The second initial alignment layer PAL2 includes a polymer, such as polyimide, polyamic acid, etc. The second initial alignment layer PAL2 may be pretilted by rubbing or through a photo-alignment scheme.

The second alignment forming layer PTL2 includes polymerized reactive mesogens which substantially allow liquid crystal molecules to be pretilted among the second alignment layer ALN2.

The second initial alignment layer PAL2 and the second alignment forming layer PTL2 may be formed of the same material or different material as the first initial alignment layer PAL1 and the first alignment forming layer PTL1, respectively.

In an embodiment, the first and second alignment layers ALN1 and ALN2 may be formed while including the initial alignment layers and the alignment forming layers, but not limited thereto or thereby. For example, the first alignment layer ALN1 and/or the second alignment layers ALN2 may be formed with a single-layered structure.

The liquid crystal layer LCL having the liquid crystal molecules LC is disposed between the first substrate SUB1 and the second substrate SUB2. The liquid crystal layer LCL has a negative dielectric anisotropy, but it should not be limited thereto or thereby. That is, the liquid crystal layer LCL may have a positive dielectric anisotropy.

The liquid crystal layer LCL comprises liquid crystal composition which includes an alkenyl liquid crystal, an antioxidant component comprising at least one selected from an antioxidant and a derivative thereof. The liquid crystal composition may further comprise at least one of an alkoxy liquid crystal, a terphenyl liquid crystal, and liquid crystals other than the alkenyl liquid crystal, the alkoxy liquid crystal or the terphenyl liquid crystal. Here, the alkenyl liquid crystal, the alkoxy liquid crystal, and the terphenyl liquid crystal have a plurality of alkenyl liquid crystal molecules, a plurality of alkoxy liquid crystal molecules, and a plurality of terphenyl liquid crystal molecules, respectively, but only referred to as the alkenyl liquid crystal, the alkoxy liquid crystal, and the terphenyl liquid crystal.

The alkenyl liquid crystal is presented in the liquid crystal composition in an amount of about 20 percent by weight to about 60 percent, about 20 percent by weight to about 50 percent by weight, about 20 percent by weight to about 40 percent by weight, about 30 percent by weight to about 60 percent by weight, or about 30 percent by weight to about 50 percent by weight, relative to the total 100 percent by weight of the liquid crystal composition. The alkenyl liquid crystal may be a low viscosity neutral liquid crystal. The alkenyl liquid crystal may have fast response time due to comparatively low viscosity compared to other liquid crystal.

The alkenyl liquid crystal may comprise at least one compound represented by the following Chemical Formulas 1a and 1b.

Chemical Formula 1a

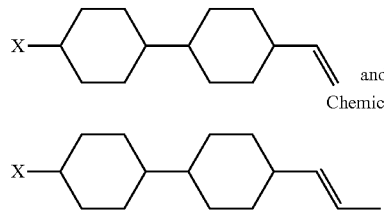

and

Chemical Formula 1b

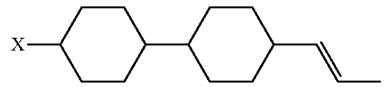

wherein each X is independently an alkyl group having 1 to 5 carbon atoms.

The alkoxy liquid crystal is present in the liquid crystal composition in an amount of greater than about 40 percent by weight and equal to or less than about 65 percent by weight, about 40 percent by weight to about 60 percent by weight, about 40 percent by weight to about 55 percent by weight, about 40 percent by weight to about 50 percent by weight, or about 50 percent by weight to about 65 percent by weight, relative to the total 100 percent by weight of the liquid crystal composition. The alkoxy liquid crystal may have a low viscosity polar liquid crystal. The alkoxy liquid crystal may show fast response time due to comparatively low viscosity compared to other liquid crystal.

The alkoxy liquid crystal may comprise at least one compound represented by the following Chemical Formulas 2a-2d.

Chemical Formula 2a

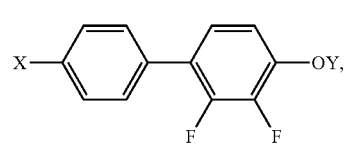

Chemical Formula 2b

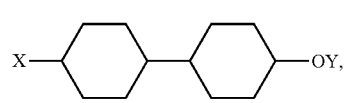

Chemical Formula 2c

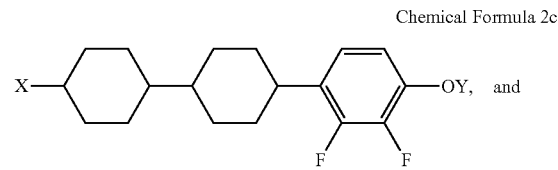

Chemical Formula 2d

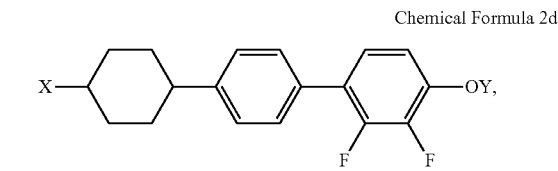

wherein each X and each Y is independently an alkyl group having 1 to 5 carbon atoms.

The terphenyl liquid crystal may be present in the liquid crystal composition in an amount of greater than 0 percent by weight and equal to or less than about 14 percent by weight, about 1 percent by weight to about 12 percent by weight, or about 2 percent by weight to about 8 percent by weight, relative to the total 100 percent by weight of the liquid crystal composition. The terphenyl liquid crystal may comprise at least one compound represented by the following Chemical Formula 3.

Chemical Formula 3

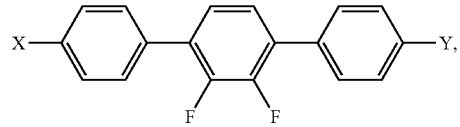

wherein each X and Y is independently an alkyl group having 1 to 5 carbon atoms.

The liquid crystal composition may further comprise a quaterphenyl liquid crystal having a plurality of quaterphenyl liquid crystal molecules represented by the following Chemical Formula 4. The quaterphenyl liquid crystal may be present in the liquid crystal composition in an amount of greater than 0 percent by weight to about 5 percent by weight, about 0.5 percent by weight to about 4.5 percent by weight, or about 1 percent by weight to about 4 percent by weight, relative to the total 100 percent by weight of the liquid crystal composition.

Chemical Formula 4

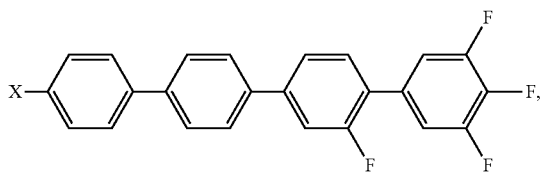

wherein X is an alkyl group having 1 to 5 carbon atoms.

The antioxidant prevents the alkenyl and/or alkoxy liquid crystals from oxidation which might occur during the manufacturing process and thereafter. Particularly, the antioxidant prevents primary oxidation of the alkenyl and/or alkoxy liquid crystals caused by light, heat, and/or reaction initiator.

The derivatives of the antioxidant represent compounds derived from the antioxidant, during the oxidation process of the alkenyl and/or alkoxy liquid crystals.

The antioxidant may be present in the liquid crystal composition in a concentration of 0 ppm to about 1000 ppm, about 5 ppm to about 800 ppm, about 10 ppm to about 500 ppm, about 10 ppm to about 300 ppm, or about 15 ppm to about 900 ppm, relative to the liquid crystal composition. The total concentration of the antioxidant component, which comprises at least one selected from an antioxidant and a derivative thereof may be in a range of greater than 0 ppm and equal to or less than about 10,000 ppm, about 5 ppm to about 8,000 ppm, about 10 ppm to about 6,000 ppm or about 20 ppm to about 9,000 ppm, relative to the liquid crystal composition.

The antioxidant may comprise at least one compound selected from an alkylated monophenol, an alkylthiomethylphenol, a hydroquinone, an alkylated hydroquinone, a tocopherol, a hydroxylated a thiodiphenyl ether, an alkylidenebisphenol, an O-, N- and S-benzyl compound, a hydroxybenzylated malonate, an aromatic hydroxybenzyl compound, a triazine compound, a benzylphosphonate, an acylaminophenol, an ester of [3-(3,5-di-tert-butyl-4-hydroxyphenyl)propionic acid with a mono- or polyhydric alcohol, an ester of [3-(5-tert-butyl-4-hydroxy-3-methylphenyl)propionic acid with a mono- or polyhydric alcohol, an ester of [3-(3,5-dicyclohexyl-4-hydroxyphenyl)propionic acid with a mono- or polyhydric alcohol, an ester of 3,5-di-tert-butyl-4-hydroxyphenyl acetic acid with a mono- or polyhydric alcohol, an amide of [3-(3,5-di-tert-butyl-4-hydroxyphenyl)propionic acid, ascorbic acid, and an aminic antioxidant.

Embodiments of the antioxidant are further described below.

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1-yl) phenol, 2,4-dimethyl-6-(1'-methyltridec-1'-yl)phenol, and combinations thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol, and combinations thereof.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate, and combinations thereof.

4. Tocopherols, for example α-tocopherol, β-tocopherol, γ-tocopherol, δ-tocopherol and combinations thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-disec-amylphenol), 4,4'-bis(2,6-dimethyl-4-hydroxyphenyl) disulfide, and combinations thereof.

6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2methylphenol), 1,1-bis(5-tert-butyl-4-hydroxy-2methylphenyl)butane, 2,6-bis(3-tert-butyl-5-methyl-2hydroxybenzyl)-4-methylphenol, 1,1,3-tris(5-tert-butyl-4 hydroxy-2-methylphenyl)butane, 1,1-bis(5-tert-butyl-4hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl 4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane, and combinations thereof.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3hydroxy-2,6-dimethylbenzyl)dithioterephthalate, bis(3,5-di-tert-butyl-4-hydroxybenzyl)sulfide, isooctyl-3,5-di-tertbutyl-4-hydroxybenzylmercaptoacetate, and combinations thereof.

8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate, and combinations thereof.

9. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5, 6-tetramethylbenzene, 2,4,6-tris(3,5-di-tert-butyl-4-hydroxybenzyl)phenol, and combinations thereof.

10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5- di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5tris(3,5-dicyclohexyl-4-hydroxybenzyl)isocyanurate, and combinations thereof.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl 3,5-di-tert-butyl-4-hydroxybenzylphosphonate, dioctadecyl-5-tertbutyl-4-hydroxy-3-methylbenzylphosphonate, the calcium salt of the monoethyl ester of 3,5-di-tert-butyl-4-hydroxybenzylphosphonic acid, and combinations thereof.

12. Acylaminophenols, for example 4-hydroxylauranilide, 4-hydroxystearanilide, octyl N-(3,5-di-tert-butyl-4-hydroxyphenyl)carbamate, and combinations thereof.

13. Esters of [β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, and combinations thereof.

14. Esters of [β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5methylphenyl)propionyloxy}-1,1-dimethylethyl]-2,4,8,10-tetraoxaspiro[5.5]-undecane, and combinations thereof.

15. Esters of [β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, and combinations thereof.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof.

17. Amides of [β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tertbutyl-4-hydroxyphenylpropionyl)trimethylenediamide, N,N'-bis (3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal), and combinations thereof.

18. Ascorbic acid (vitamin C)

19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3 dimethylbutyl)-N'-phenyl-p-phenylenediamine, N-(1 methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1 naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'diaminodiphenylmethane, 1,2-bis[(2-methylphenyl) amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol, and combinations thereof.

The antioxidant may be employed among commercially acceptable one. The commercially acceptable antioxidant is described as below and the antioxidant may be at least one compound as below.

2,2'-Thiodiethylene bis[3-(3,5-di-t-butyl-4-hydroxyphenyl)propionate] available as ANOX® 70 (CAS 41484-35-9), 1,3,5-trimethyl-2,4,6-tris(3,5-di-tert-4-hydroxybenzyl)benzene available as ANOX® 330 (CAS 1709-70-2), a C13-C15 alkyl ester of 3,5-bis(1,1-dimethylethyl)-4-hydroxy-benzenepropanoic acid available as ANOX® 1315 (CAS 171090-93-0), a C13-C15 alkyl ester of 3,5-bis(1,1-dimethylethyl)-4-hydroxy-benzenepropanoic acid available as ANOX® PP18 (CAS 2082-79-3), 1,3,5-tris(4-tert.-butyl-3-hydroxy-2,6-dimethylbenzyl)-1,3,5-triazine-2,4,6-(1H,3H,5H)-trione available as LOWINOX® 1790 (CAS 40601-76-1), 2,2'-methylenebis(6-t-butyl-4-methylphenol) available as LOWINOX® 22M46 (CAS 119-47-1), 1,1-bis(2-methyl-4-hydroxy-5-tert-butylphenyl)butane available as LOWINOX® 44B25 (CAS 85-60-9), 1,1,3-tris(2'-methyl-4'-hydroxy-5'-t-butylphenyl)butane available as LOWINOX® CA22 (CAS 1843-03-4), a butylated reaction product of p-cresol and dicyclopentadiene available as LOWINOX® CPL (CAS 68610-51-5), triethyleneglycol-bis[3-(3-t-butyl-4-hydroxy-5-methylphenyl)propionate] available from LOWINOX® GP45 (CAS 36443-68-2), N,N'-hexamethylene bis[3-(3,5-di-t-butyl-4-hydroxyphenyl)propionamide available as LOWINOX® HD98 (CAS 23128-74-7), 2,2'-thiobis(6-t-butyl-4-methylphenol) available as LOWINOX® TBP6 (CAS 90-66-4), F2,2' methylenebis[4-methyl-6-(1-methyl-cyclohexyl)phenol] available as LOWINOX® WSP (CAS 77-62-3), 2,2'-methylenebis(6-nonyl-p-cresol) available as NAUGARD® 536 (CAS 7786-17-6).

In the liquid crystal display device, when a gate signal is applied to the gate line GLn, the thin film transistor Tr is turned on. Therefore, the data signal applied to the data line DLm is applied to the pixel electrode PE through the turned-on thin film transistor Tr. When the data signal is applied to the pixel electrode PE through the turned-on thin film transistor Tr, the electric field is generated between the pixel electrode PE and the common electrode CE by a difference of voltages respectively applied to the common electrode CE and the pixel electrode PE. Because of the generated electrical field, the liquid crystal molecules LC are driven. Accordingly, an amount of the light passing through the liquid crystal layer LCL is varied, and thus the image is displayed in the liquid crystal display device.

In an embodiment, the liquid crystal display device according to the present exemplary embodiment may have various pixel structures. For instance, one pixel may be connected to two gate lines and one data line according to another embodiment. In addition, one pixel may be connected to one gate line and two data lines according to another embodiment. Further, one pixel may include two sub-pixels applied with different voltages from each other. In this case, one of the sub-pixels is applied with a high voltage and the other one of the sub-pixels is applied with a low voltage. In addition, in the present exemplary embodiment, the pixel electrode has fine slits and the common electrode is integrally formed as a single unitary and individual unit, but they should not be limited thereto or thereby. As an example, a domain division member, e.g., slit or protrusion, may be provided to the pixel electrode and the common electrode to divide each pixel into plural domains.

Figure 3:
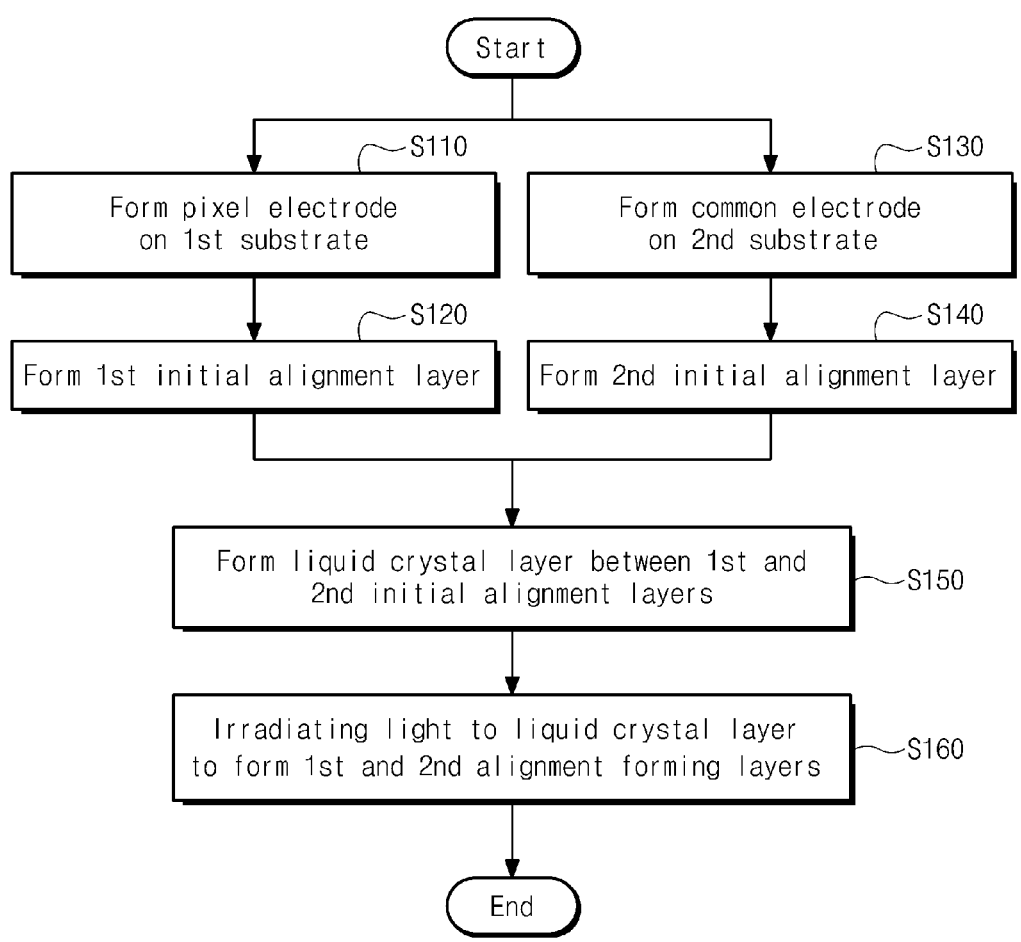
FIG. 3 is a flowchart showing an exemplary embodiment of a method of manufacturing a liquid crystal display device.

FIG. 3 is a flowchart showing an exemplary embodiment of a method of manufacturing a liquid crystal display device.

Referring to FIG. 3, in order to manufacture the liquid crystal display device according to the present exemplary embodiment, various elements including the pixel electrode are formed on the first base substrate (S110) and the first initial alignment layer is formed on the first base substrate (S120). Separately, various elements including the common electrode are formed on the second base substrate (S130) and the second initial alignment layer is formed on the second base substrate (S140). Then, the liquid crystal layer is disposed between the first initial alignment layer and the second initial alignment layer (S150). The liquid crystal layer comprises a liquid crystal composition which includes an alkenyl liquid crystal, an antioxidant, and reactive mesogens. After that, light such as ultraviolet (UV) ray is irradiated to the liquid crystal composition to cure or polymerize the reactive mesogens thereby forming the first alignment forming layer and the second alignment forming layer (S160).

Figure 4A:
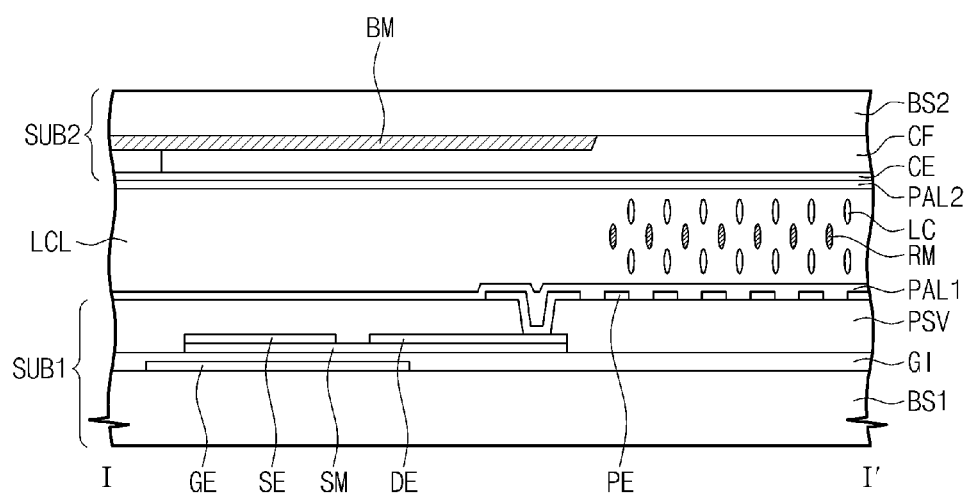
FIGS. 4A and 4B are cross-sectional views showing an exemplary embodiment of a method of forming alignment forming layers.
Figure 4B:
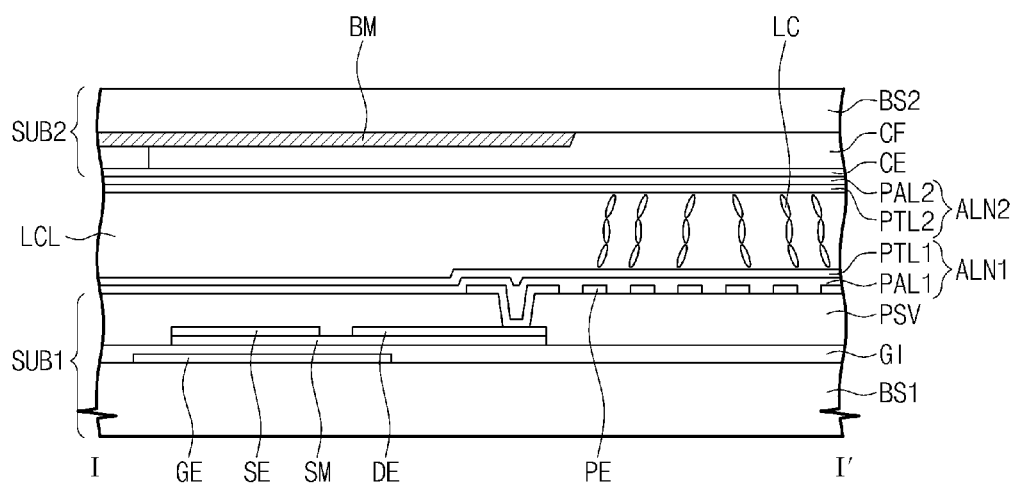

FIGS. 4A and 4B are cross-sectional views showing an exemplary embodiment of a method of forming alignment forming layers.

Hereinafter, the method of manufacturing the liquid crystal display device will be described in detail with reference to FIGS. 1 to 3, 4A, and 4B.

First, the method of forming the elements including the pixel electrode on the first base substrate BS1 will be described in detail with reference to FIGS. 1 and 2.

A gate pattern is formed on the first base substrate BS1. The gate pattern includes the gate line GLn and the storage electrode part. The gate pattern can be formed by, for example, a photolithography process.

The gate insulating layer GI is formed on the gate pattern.

The semiconductor layer SM is formed on the gate insulating layer GI. The semiconductor layer SM includes the active pattern and the ohmic contact layer formed on the active pattern. The semiconductor layer SM can be formed, for example, by using a photolithography process.

A data pattern is formed on the semiconductor layer SM. The data pattern includes the data line DLm, the source electrode SE, and the drain electrode DE. The data pattern can be formed, for example, by using a photolithography process. In this case, the semiconductor layer SM and the data pattern may be formed using one half mask or one diffraction mask.

The protective layer PSV is formed on the data pattern. The protective layer PSV is provided with the contact hole CH formed therethrough to expose the portion of the drain electrode DE. The protective layer can be formed, for example, by a photolithography process.

The pixel electrode PE is formed on the protective layer PSV to be connected to the drain electrode DE through the contact hole CH. The pixel electrode PE can be formed, for example, by using a photolithography process.

Then, the first initial alignment layer PAL1 is formed on the first base substrate BS1 on which the pixel electrode PE is formed. The first initial alignment layer PAL1 is formed, for example, by coating an alignment solution containing a material comprising at least one selected from a polymer, e.g., a polyimide and a polyamic acid and a monomer of the polymer on the first base substrate BS1 and heating the alignment solution.

Again, the method of forming the second substrate SUB2 will be described in detail with reference to FIGS. 1 and 2.

A color filter CF displaying the color can be formed on the second base substrate BS2. The common electrode CE can be formed on the color filter CF. The color filter CF and the common electrode CE may be formed, for example, by a photolithography process, but they should not be limited thereto or thereby.

The second initial alignment layer PAL2 can be formed on the second substrate SUB2 where the common electrode CE is formed. The second initial alignment layer PAL2 can be formed, for example, by coating an alignment solution on the first base substrate BS1 and heating the alignment solution. The second initial alignment layer PAL2 may have the same material as that of the first initial alignment layer PAL1 and may be formed by the same process as that of the first initial alignment layer PAL 1.

Then, referring to FIG. 4A, the first substrate SUB1 and the second substrate SUB2 are placed to face each other and a liquid crystal layer LCL is formed between the first and second substrates SUB1 and SUB2.

The liquid crystal layer LCL comprises a liquid crystal composition which includes an alkenyl liquid crystal, an antioxidant, and reactive mesogens RM. In drawings, all types of liquid crystals are described as the term of "LC" regardless of the type of the liquid crystals. The liquid crystal composition, in addition to the alkenyl liquid crystal, may further comprise at least one of an alkoxy liquid crystal, a terphenyl liquid crystal, and liquid crystals other than the alkenyl, alkoxy, and terphenyl liquid crystals. In an embodiment, the explanation of alkenyl, alkoxy, terphenyl, and other liquid crystals are described hereinabove, thus the explanation is omitted for avoiding redundancy.

The antioxidant prevents the alkenyl and/or alkoxy liquid crystals from being oxidized which may occur during the manufacturing process and thereafter. Particularly, the antioxidant prevents primary oxidation of the alkenyl and/or alkoxy liquid crystals caused by light, heat, and/or reaction initiator. The light delivers energy to the alkenyl and alkoxy liquid crystals which may cause the alkenyl and alkoxy liquid crystals to react. The light may be UV ray, but the wavelength of the light should not be limited thereto or thereby, and the UV ray will be explained as the light hereinafter.

Since the derivatives of the antioxidant are generated during the oxidation process of the alkenyl and/or alkoxy liquid crystals, the initial liquid crystal composition does not include the derivatives of the antioxidant. The derivatives of the antioxidant are generated when ions or radicals are formed, which will be described later.

The antioxidant is present in the liquid crystal composition in concentration of greater than 0 ppm and equal to or less than about 10,000 ppm, about 5 ppm to about 8,000 ppm, about 10 ppm to about 6,000 ppm or about 20 ppm to about 9,000 ppm.

The antioxidant may comprise at least one compound selected from an alkylated monophenol, an alkylthiomethylphenol, a hydroquinone, an alkylated hydroquinone, a tocopherol, a hydroxylated thiodiphenyl ether, an alkylidenebisphenol, an O-, N- and S-benzyl compound, a hydroxybenzylated malonate, an aromatic hydroxybenzyl compound, a triazine compound, a benzylphosphonate, an acylaminophenol, an ester of [3-(3,5-di-tert-butyl-4-hydroxyphenyl)propionic acid with a mono- or polyhydric alcohol, an ester of [3-(5-tert-butyl-4-hydroxy-3-methylphenyl)propionic acid with a mono- or polyhydric alcohol, an ester of [3-(3,5-dicyclohexyl-4-hydroxyphenyl)propionic acid with a mono- or polyhydric alcohol, an ester of 3,5-di-tert-butyl-4-hydroxyphenyl acetic acid with a mono- or polyhydric alcohol, an amide of [3-(3,5-di-tert-butyl-4-hydroxyphenyl)propionic acid, ascorbic acid, and an aminic antioxidant. The embodiments of the antioxidant are described hereinabove, the explanation of the embodiments is omitted for avoiding the redundancy.

The reactive mesogens RM are present in the liquid crystal composition in the amount of 0 percent by weight to about 30 percent by weight, relative to the total 100 percent by weight of the liquid crystal composition. In an embodiment, the reactive mesogens RM are present in the liquid crystal composition in the amount of 0 percent by weight to about 3 percent by weight, relative to the total 100 percent by weight of the liquid crystal composition. The embodiments of the reactive mesogens RM are described hereinabove, thus the explanation of the embodiments of the reactive mesogens RM are omitted for avoiding the redundancy.

Next, referring to FIG. 4B, the UV ray is irradiated to the liquid crystal layer LCL to cure or polymerize the reactive mesogens RM in the liquid crystal layer LCL. While the UV ray is irradiated to the liquid crystal layer LCL, an electric field may also be applied to the liquid crystal layer LCL.

After some time has passed from the UV ray irradiation, the reactive mesogens are polymerized and attached to the first and second initial alignment layers to form branches. As a result, a first alignment forming layer is formed on the first initial alignment layer and the second alignment forming layer is formed on the second initial alignment layer. The first and second alignment forming layers allow the liquid crystal molecules LC to pretilt in a specific direction.

For example, when the electric field is applied to the liquid crystal molecules LC, the reactive mesogens RM are aligned in the same direction as the liquid crystal molecules LC in the area surrounding the reactive mesogens RM. When the UV ray is provided to the liquid crystal layer LCL while the reactive mesogens RM are aligned in the same direction as the liquid crystal molecules LC, the reactive mesogens RM are reacted with each other, and thus forming a network among the reactive mesogens RM. The reactive mesogens RM can be linked to adjacent reactive mesogens RM to form a side chain. In this case, as the reactive mesogens RM form the network after the liquid crystal molecules LC are aligned, the reactive mesogens RM have a specific directivity according to an average alignment direction of the liquid crystal molecules LC. Thus, although the electric field disappears, the liquid crystal molecules LC disposed adjacent to the network have a pretilt angle.

In an embodiment, some liquid crystals may be oxidized when the light irradiation is applied to the liquid crystal layer to cure or to polymerize the reactive mesogens RM. During the UV ray irradiation, the reactive mesogens RM, the liquid crystals themselves, impurities, etc. in the liquid crystal layers LCL may form ions or radicals, which may react with adjacent liquid crystals LC, generating by-products. The alkenyl liquid crystal and the alkoxy liquid crystal, particularly the alkenyl liquid crystal, are likely to be oxidized. The oxidized liquid crystals do not operate properly when an electric field is applied thereto, thereby reducing the voltage holding ratio and causing defects such as spots and afterimages.

The following Reaction Scheme 1 represents reactions which may occur for the alkenyl liquid crystal. In the Reaction Scheme 1, R is an alkyl group having 1 to 5 carbon atoms. As shown in Reaction Scheme 1, the oxidation products of the alkenyl liquid crystal include an aldehyde, which is known to contribute the voltage holding ration drop, spots, line and/or surface afterimages, etc.

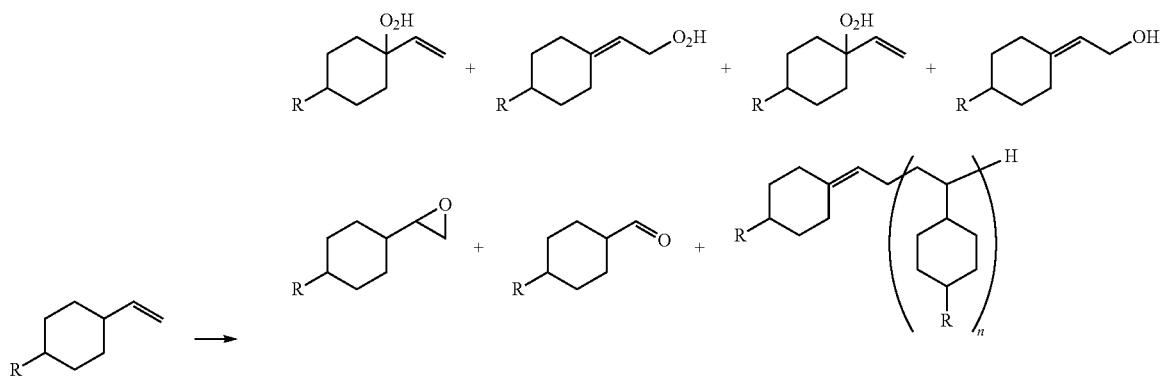

Reaction Scheme 1

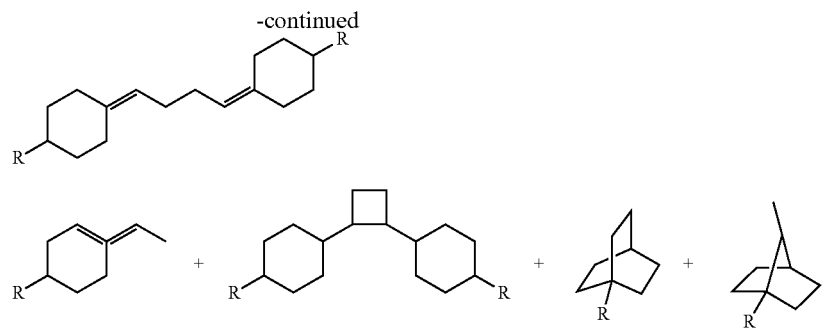

The antioxidant may be a hydrogen (H) donor or radical scavenger which prevents other liquid crystals from reacting with the radicals or ions. For example, when unstable radicals like peroxide radicals are generated, the antioxidant reacts with the radicals in order to prevent other liquid crystals from reacting with the radicals.

The following Reaction Scheme 2 represents reactions of an exemplary embodiment of an antioxidant of 2,6-di-t-butyl-4-methylphenol, which reacts as a radical scavenger. In Reaction Scheme 2, R is a functional group connected to peroxide, which is only for description of peroxide and may not be limited to any specific functional group.

crystal composition. For example, though the initial liquid crystal composition contains the antioxidant in the concentration of greater than 0 and equal to or less than about 10,000 ppm, the liquid crystal composition after heat or UV radiation may contain the antioxidant in a concentration of 0 to about 1,000 ppm. The difference of the concentration is caused by the decomposition of the antioxidant.

In an embodiment, the generation of the radicals or ions caused by UV during the step of curing the reactive mesogens is explained, but the generation of impurities is not limited thereto. For example, regardless of the step of curing the reactive mesogens, by-products such as other radicals or ions

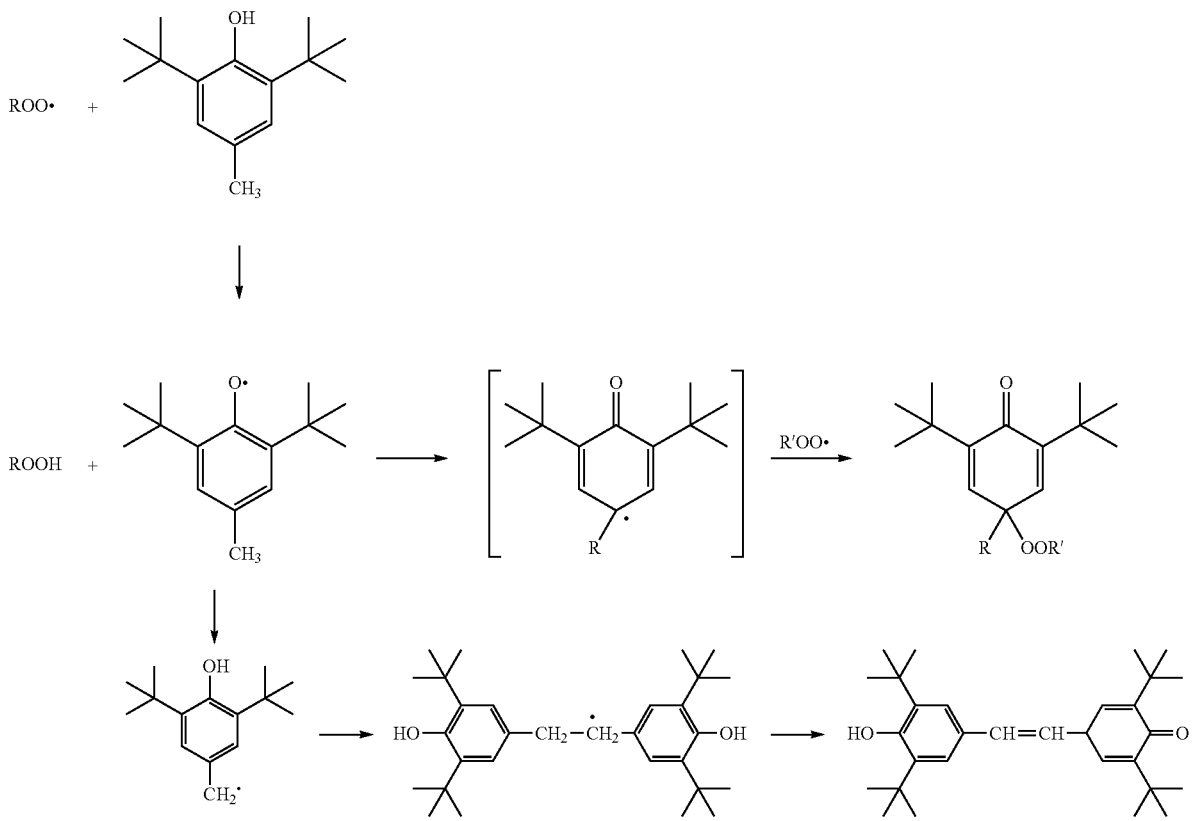

Reaction Scheme 2

As shown in Reaction Scheme 2, the antioxidant reacts with the peroxide ion thus generating derivatives thereof. Therefore, the resulting liquid crystal composition contains less amount of the antioxidant than that of the initial liquid may be generated in various steps such as a step of heating for forming other elements. The antioxidant also reacts with the radicals and ions generated in various steps to allow the liquid crystals to be stable.

Then, the cured reactive mesogens RM may be secondly cured after the electric field disappears. The reactive mesogens RM, which are not cured in the first curing process, may be further cured through the second curing process.

The liquid crystal display device manufactured by the above-mentioned method according to the present exemplary embodiment effectively prevents liquid crystals from oxidation. Thus, the voltage holding ratio drop is prevented and the defects caused by the oxidation of the liquid crystals such as spots, line and surface afterimages are prevented or decreased.

Although the exemplary embodiments have been described, it is understood that the present disclosure should not be limited to these exemplary embodiments but various changes and modifications can be made by one ordinary skilled in the art within the spirit and scope of the present disclosure as hereinafter claimed.

Hereinafter, concrete embodiments will be explained.

1. Liquid Crystal Composition in Embodiments

Exemplary embodiments of liquid crystal compositions are described in Table 1.

TABLE 1

| Reactive Mesogens | | 1st Liquid Crystal Composition RMB | 2nd Liquid Crystal Composition RMI | 3rd Liquid Crystal Composition RMI | 4th Liquid Crystal Composition RMI | 5th Liquid Crystal Composition RMI |
|---|---|---|---|---|---|---|
| Properties | Tni | 74.7 | 74.7 | 75.2 | 74.5 | 74.6 |
| | $\Delta n$ | 0.1082 | 0.1082 | 0.1082 | 0.1082 | 0.1082 |
| | $\Delta \epsilon$ | −3.0 | −3.0 | −3.2 | −3.2 | −3.2 |
| | $\gamma l$(mPas) | 97 | 97 | 100 | 98 | 94 |
| | K11 | 12.9 | 12.9 | 12.7 | 13.0 | 13.0 |
| | K33 | 15.7 | 15.7 | 14.7 | 14.5 | 14.6 |
| Alkenyl LC(wt %) | | 38.5 | 38.5 | 35.0 | 25.0 | 36.5 |
| Alkoxy LC(wt %) | | 48.5 | 48.5 | 51.5 | 60.5 | 56.5 |
| Terphenyl LC(wt %) | | 12.5 | 12.5 | 11.0 | 0.0 | 0.0 |
| 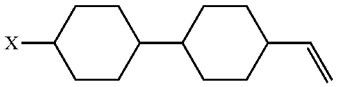 | | 28.5 | 28.5 | 29.0 | 25.0 | 36.5 |
| 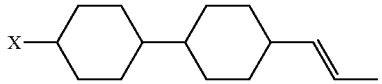 | | 10 | 10 | 6.0 | — | — |
| 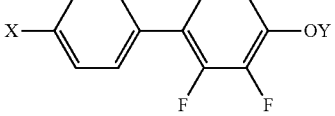 | | — | — | — | 13.0 | 13.5 |
| 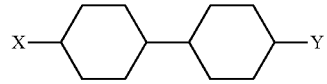 | | — | — | 2.0 | 6.0 | — |
| 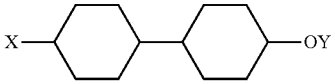 | | — | — | — | 4.0 | — |
| 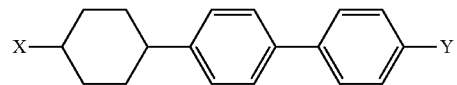 | | — | — | — | 8.0 | 6.5 |
| 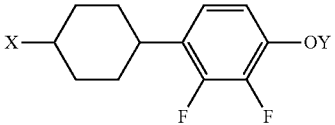 | | 21.5 | 21.5 | 20.0 | 9.5 | 9 |
| 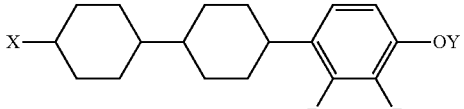 | | 11 | 11 | 11.5 | 14.0 | 14 |
| 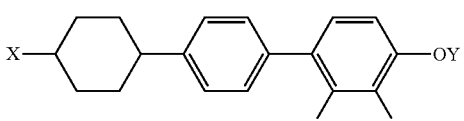 | | 16 | 16 | 20.0 | 20.0 | 20 |

TABLE 1-continued

| Reactive Mesogens | 1st Liquid Crystal Composition RMB | 2nd Liquid Crystal Composition RMI | 3rd Liquid Crystal Composition RMI | 4th Liquid Crystal Composition RMI | 5th Liquid Crystal Composition RMI |
|---|---|---|---|---|---|
| X—⟨phenyl⟩—⟨phenyl-F,F⟩—⟨phenyl⟩—Y | 12.5 | 12.5 | 11.0 | — | — |
| X—⟨phenyl⟩—⟨phenyl⟩—⟨phenyl-F⟩—⟨phenyl-F,F,F⟩—F | 0.5 | 0.5 | 0.5 | 0.5 | 0.5 |

Figure 5:
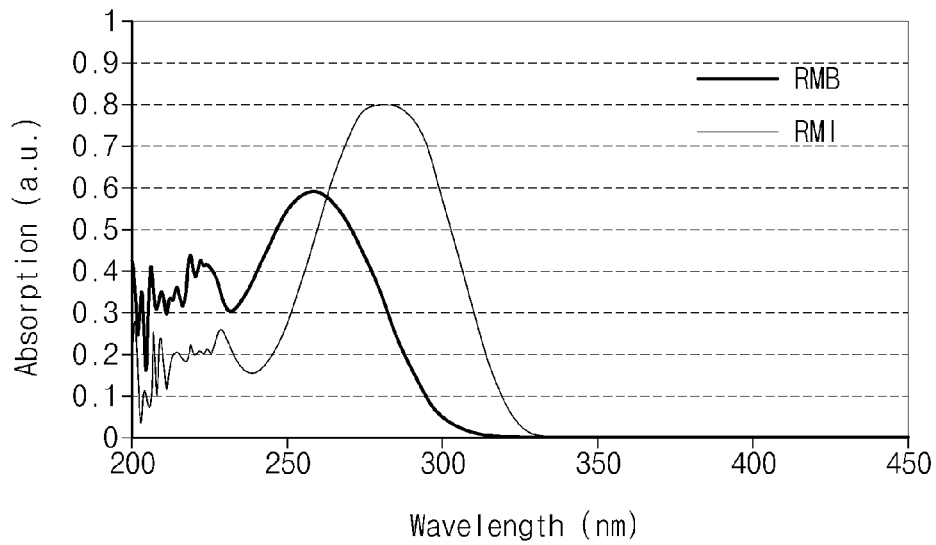
FIG. 5 is a graph of light absorption (arbitrary units, a.u.) versus wavelength (nanometers, nm) showing an absorption spectrum of reactive mesogens RMI and RMB.

The reactive mesogens in all liquid crystal compositions are present in an amount of 0.4 percent by weight relative to the total weight of the liquid crystal composition, respectively. The reactive mesogens RMI and RMB having UV absorption spectrum shown n FIG. 5 are provided to the liquid crystal composition.

Figure 6A:
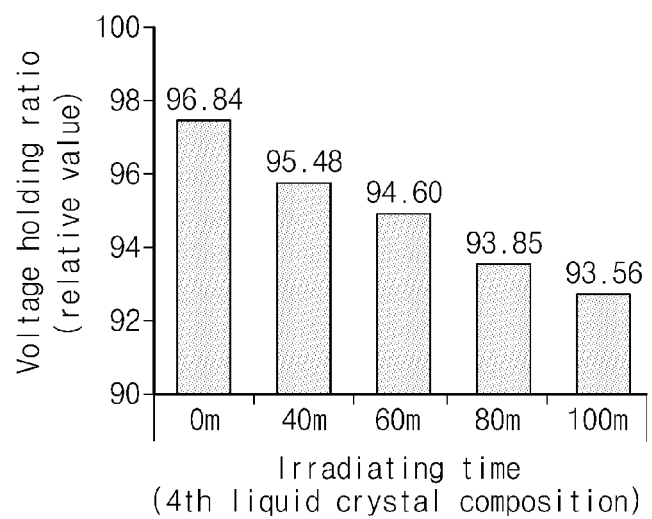
FIGS. 6A to 6C are graphs of voltage holding ratio (relative value) versus irradiating time (minutes, m) showing voltage holding ratios with respect to the irradiation time of UV for the fourth, fifth, and second exemplary liquid crystal compositions, respectively.
Figure 6B:
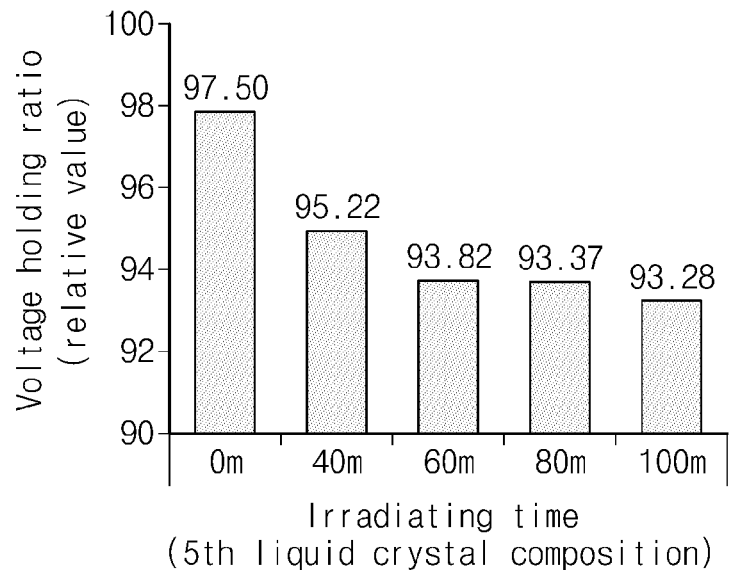
Figure 6C:
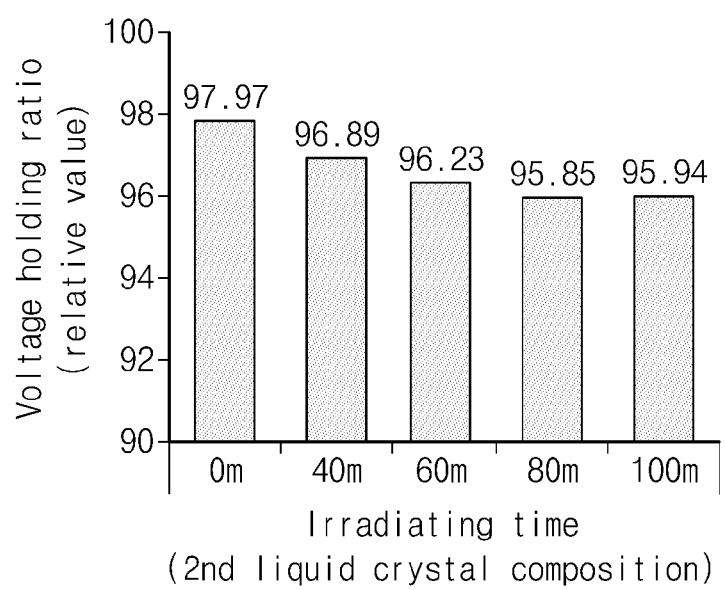

2. Relation Between the Content of Alkenyl Liquid Crystal and Voltage Holding Ratio FIGS. 6A to 6C are graphs representing voltage holding ratio with respect to the irradiation time of UV in the fourth, fifth, and second liquid crystal compositions, respectively. Same conditions are employed for all three liquid crystal compositions. The fourth liquid crystal composition contains the alkenyl liquid crystal in the amount of 25 percent by weight, the fifth liquid crystal composition contains the alkenyl liquid crystal in the amount of 36.5 percent by weight, and the second liquid crystal composition contains the alkenyl liquid crystal in the amount of 38.5 percent by weight relative to the total weight of liquid crystal composition, respectively.

Referring to FIGS. 6A and 6C, the voltage holding ratios for all three liquid crystal compositions decrease as the UV irradiation time becomes longer.

Compared to the fourth liquid crystal composition and the fifth liquid crystal composition, the reduction of the voltage holding ratio in the fifth liquid crystal composition is larger than that in the fourth liquid crystal composition. Here, it is noted that the fifth liquid crystal composition includes approximately similar content of the alkoxy liquid crystal but includes more alkenyl liquid crystal than that of the fourth liquid crystal composition. Specifically, when UV is irradiated to both liquid crystal compositions for 80 minutes in the same condition, the liquid crystal display employing the fourth liquid crystal composition has the voltage holding ratio of 93.85, which is dropped in 3.08% from the value of 96.84 prior to the irradiation, and the liquid crystal display employing the fifth liquid crystal composition has the voltage holding ratio of 93.37, which is dropped in 4.213% from the value of 97.50 prior to the irradiation. That means more denaturalization of the alkenyl liquid crystal occurs as the irradiation time becomes longer.

Figure 7A:
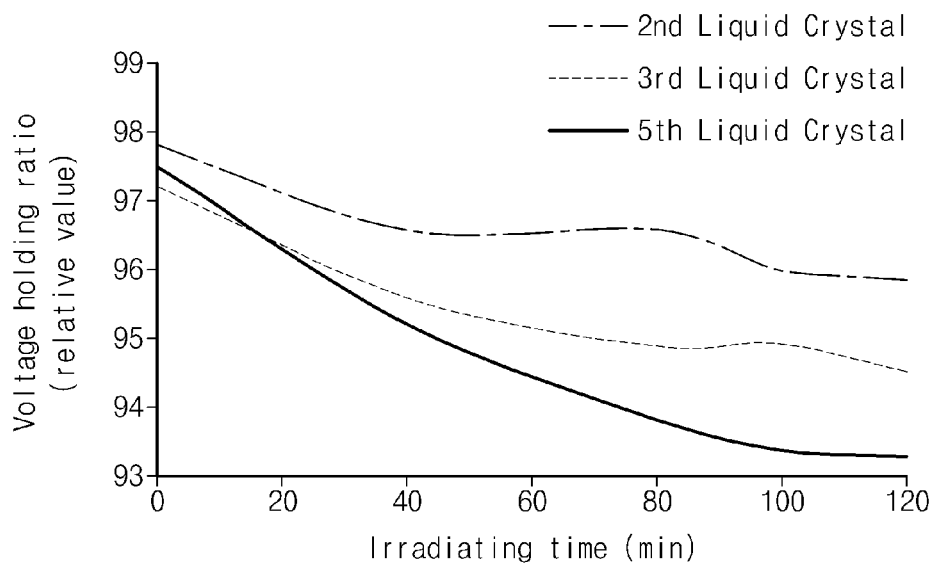
FIGS. 7A to 7B are graphs of voltage holding ratio (relative value) versus irradiating time (minutes, m) showing voltage holding ratios with respect to the irradiation time of UV for liquid crystal display devices employing the second, third, and fifth liquid crystal compositions, wherein the display devices are exposed to light from a backlight unit or exposed to heat and electrical field, respectively, before being exposed to UV irradiation.
Figure 7B:
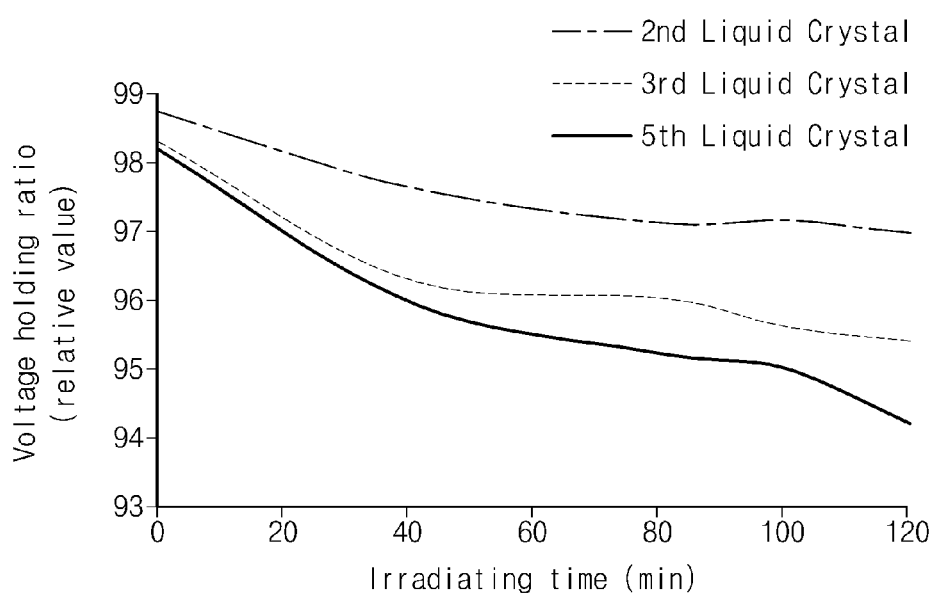

3. Relation Between the Content of Alkoxy Liquid Crystal and Voltage Holding Ratio FIGS. 7A to 7B are graphs representing voltage holding ratios with respect to the irradiation time of UV in the second, third, and fifth liquid crystal compositions according to the present disclosure. Particularly, FIG. 7A shows a graph of a voltage holding ratio of the three liquid crystal displays, which are manufactured by employing the three liquid crystal compositions, and which are irradiated by UV for minutes, after exposed to light from a backlight unit, such as visible light, for a predetermined time. FIG. 7B shows a graph of a voltage holding ratio of the three liquid crystal displays, which are manufactured by employing the three liquid crystal compositions, and which are irradiated by UV for minutes, after exposed to heat and electric field for a predetermined time.

In FIGS. 7A and 7B, the same manufacturing processes and the same conditions are employed to the three liquid crystal displays except that different liquid crystal compositions are used.

Referring to 7A and 7B, the voltage holding ratios of the three liquid crystal displays decrease as the irradiation time becomes longer regardless of whether the display is exposed to the light from a backlight unit, or exposed to the heat and the electric field.

The second, third, and fifth liquid crystal compositions include approximately similar amount of alkenyl liquid crystal. However, the content of the alkoxy liquid crystal increases in the order of the second liquid crystal composition, the third liquid crystal composition, and the fifth liquid crystal composition. FIGS. 7A and 7B indicate that the reduction of the voltage holding ratio also increases in the order of the second liquid crystal composition, the third liquid crystal composition, and the fifth liquid crystal composition. That means that the voltage holding ratio decreases as the content of the alkoxy liquid crystal increases and more alkoxy liquid crystal is oxidized as the irradiation time becomes longer.

4. Relation Between the Content of Reactive Mesogens and Voltage Holding Ratio

Figure 8A:
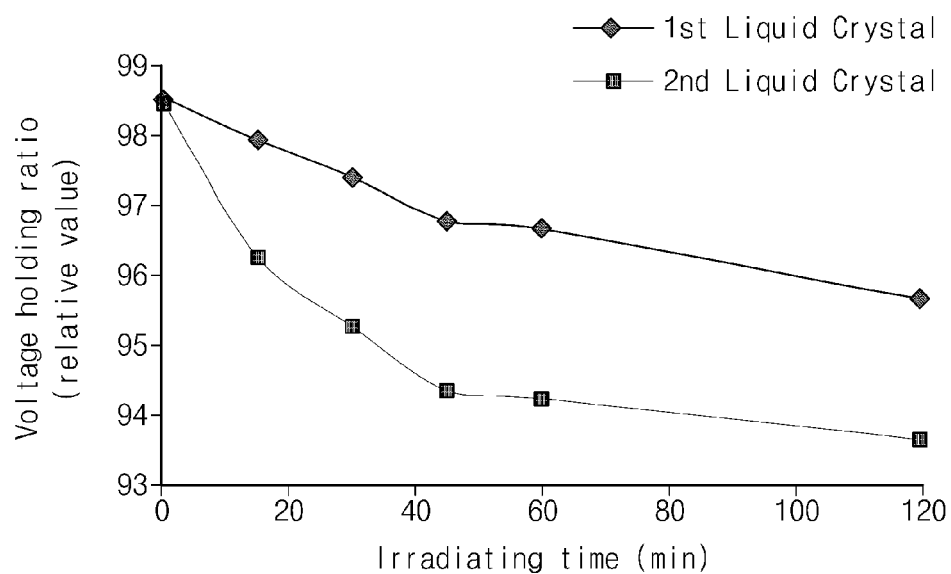
FIGS. 8A and 8B are graphs of voltage holding ratio (relative value) versus irradiating time (minutes, m) showing voltage holding ratios with respect to the irradiation time of UV for liquid crystal display devices employing the first and second liquid crystal compositions, wherein the display devices are exposed to light from a backlight unit or exposed to heat and electrical field, respectively, before being exposed to UV irradiation.
Figure 8B:
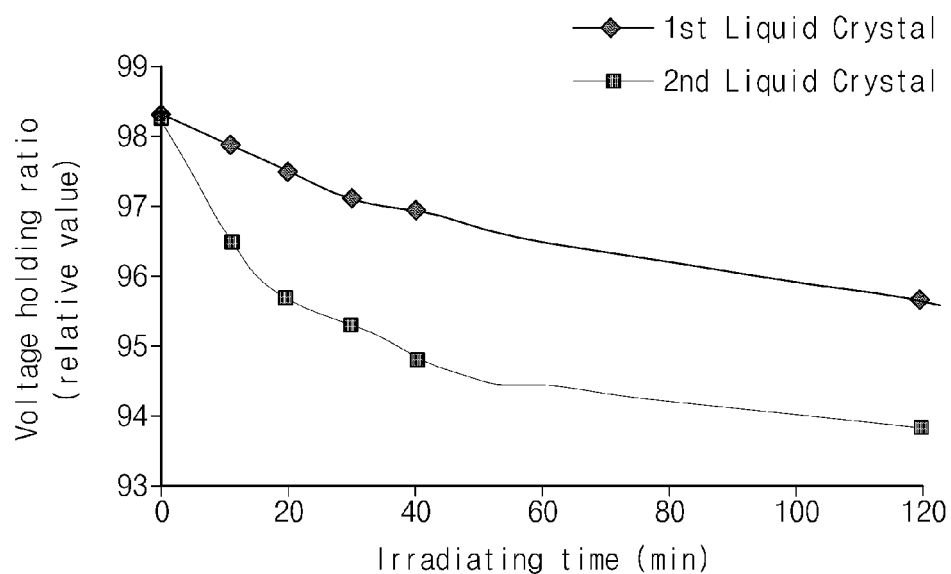

FIGS. 8A and 8B are graphs representing voltage holding ratios with respect to the irradiation time of UV in the first and second liquid crystal compositions according to the present disclosure. Particularly, FIG. 8A shows a graph of a voltage holding ratio of the two liquid crystal displays, which are manufactured by employing the first and second liquid crystal compositions, and which are irradiated by UV for minutes, after exposed to light from a backlight unit for a predetermined time. FIG. 8B shows a graph of a voltage holding ratio of the two liquid crystal displays, which are manufactured by employing the two liquid crystal compositions, and which are irradiated by UV for minutes, after exposed to heat and electric field for a predetermined time.

In FIGS. 8A and 8B, the same manufacturing processes and the same conditions are employed to the two liquid crystal displays except that different liquid crystal compositions are used. The first and second liquid crystal compositions include substantially the same elements except for the types of the reactive mesogens.

Referring to 8A and 8B, the voltage holding ratios of the three liquid crystal displays decrease as the irradiation time becomes longer regardless of whether the display is exposed to the light from a backlight unit, or exposed to the heat and the electric field. In addition, the voltage holding ratio of the second liquid crystal composition, which has the reactive mesogens with more reactivity in UV region, decreases more than that of the first liquid crystal composition. It means that the side reaction of the reactive mesogens more occurs as the irradiation time becomes longer.

5. Relation Between the Contents of Alkenyl Liquid Crystal, Alkoxy Liquid Crystal, and Reactive Mesogens and Voltage Holding Ratio As described as before, the voltage holding ratio decreases as the content of the alkenyl liquid crystal, the content of the alkoxy liquid crystal, or the reactivity of the reactive mesogens increases, which is caused by oxidation reaction of the liquid crystal molecules during UV irradiation. In an embodiment, the alkenyl and alkoxy liquid crystals may be necessary for fast response time because of the alkenyl and alkoxy liquid crystals have comparatively low-viscosity. In addition, when the reactivity of the reactive mesogens is lower than a specific degree, polymerization may not occur or may insufficiently occur, thereby it is difficult to form branch chains. Thus, there are limits as to how much one can change of the content of the alkenyl liquid crystal, the content of the alkoxy liquid crystals, and the reactivity of the reactive mesogens. In an embodiment, the liquid crystal molecules are effectively prevented from oxidation by addition antioxidant to the liquid crystal composition.

6. Content of Aldehyde with Respect to Antioxidant

Figure 9:
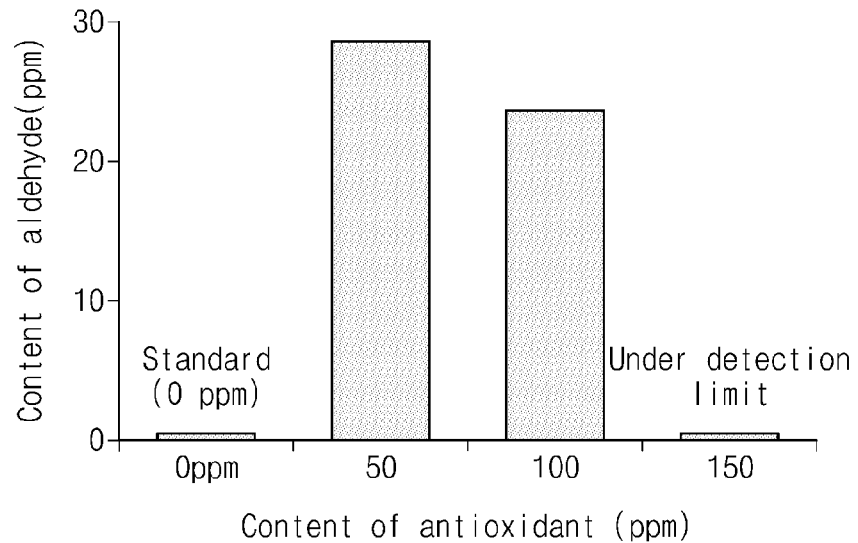
FIG. 9 is a graph of the content of aldehyde (parts per million, ppm) versus the content of antioxidant (parts per million, ppm) showing the content of aldehyde with respect to the content of the antioxidant after UV irradiation for a comparative liquid crystal display device and liquid crystal display devices of the disclosure.

Aldehyde is a notable by-product of the alkenyl liquid crystal. FIG. 9 is a graph showing the content of aldehyde (ppm) with respect to the content of the antioxidant after UV irradiation for a comparative liquid crystal display and the liquid crystal displays according to the present disclosure. The comparative liquid display and the liquid crystal display according to the present disclosure are manufactured by the same process and tested under the same conditions. The "standard" in FIG. 9 is for the comparative liquid crystal display employing a liquid crystal composition without the alkenyl liquid crystal and antioxidant. Others, i.e., 50 ppm, 100 ppm, and 150 ppm are for the liquid crystal display according to the present disclosure, which employs the first liquid crystal composition with the antioxidant of 50 ppm, 100 ppm, and 150 ppm, respectively.

Referring to FIG. 9, the comparative liquid crystal display without the alkenyl liquid crystal has the content of aldehyde under the detection limit. It is understood that no aldehyde is generated because the liquid crystal composition does not contain alkenyl liquid crystal. On the contrary, in the liquid crystal display with antioxidant according to the present disclosure, although the alkenyl liquid crystal is present, the content of the aldehyde decreases as the content of the antioxidant increases. Particularly, the content of aldehyde in the first liquid crystal composition with the antioxidant of 150 ppm has the aldehyde content under the detection limit, which confirms that the antioxidant may prevent the alkenyl liquid crystal from being oxidized to aldehyde.

7. Voltage Holding Ratio with Respect to Content of Antioxidant

Figure 10A:
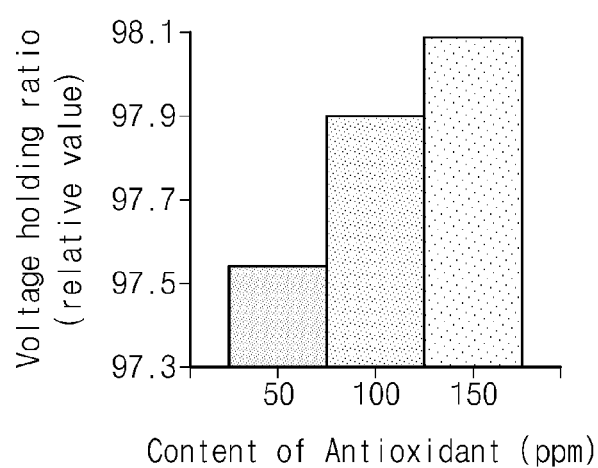
FIGS. 10A and 10B are graphs of voltage holding ratio (relative value) versus content of antioxidant (parts per million, ppm) showing voltage holding ratios with respect to the content of the antioxidant wherein the display devices according to the present disclosure are exposed to light from a backlight unit or exposed to heat and electrical field, respectively, before being exposed to UV irradiation.
Figure 10B:
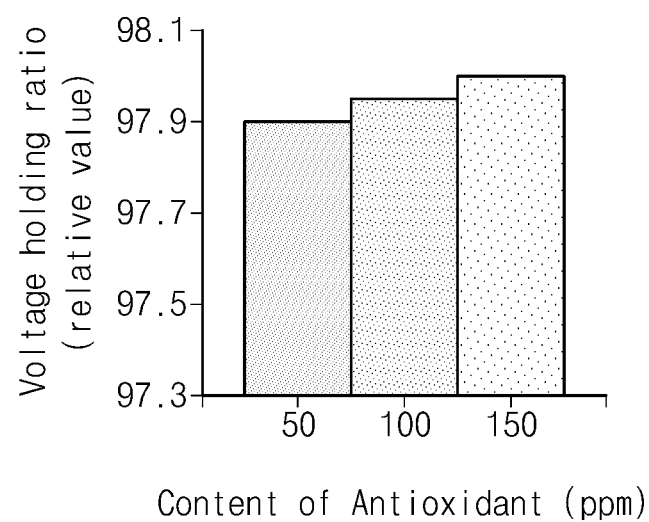

FIGS. 10A and 10B are graphs showing voltage holding ratios with respect to the content of the antioxidant according to the present disclosure. Particularly, FIG. 10A shows graph of a voltage holding ratios of three liquid crystal displays, which are manufactured by employing the liquid crystal compositions having three different antioxidant content of 50 ppm, 100 ppm, and 150 ppm, respectively, and being irradiated by UV for minutes, after exposed to light from a backlight unit, such as visible light, for a predetermined time. FIG. 10B shows a graph of a voltage holding ratio of the three liquid crystal displays, which are manufactured by employing the liquid crystal compositions having three different antioxidant content of 50 ppm, 100 ppm, and 150 ppm, respectively, and being irradiated by UV for minutes, after exposed to heat and electric field for a predetermined time.

Referring to 10A and 10B, the voltage holding ratios of the three liquid crystal displays increase as the content of the antioxidant increases, regardless whether the display is exposed to backlight, the heat or the electric field or not.

8. Reduction of Spots with Respect to Content of Antioxidant

Table 2 shows the result of horizontal line spots with respect to the content of the antioxidant. In Table 2, the horizontal line spots are measured for the liquid crystal display employing the first liquid crystal composition and 50 ppm, 100 ppm, and 150 ppm of the antioxidant. The horizontal line spots are measured by the naked eye or by machine and counted when the spots satisfying predetermined standard. The terms of "few" and "normal" are only the relative reference to determine the number of defects.

TABLE 2

|  |  | 1st Liquid Crystal Composition (50 ppm antioxidant) | 1st Liquid Crystal Composition (100 ppm antioxidant) | 1st Liquid Crystal Composition (150 ppm antioxidant) |
| --- | --- | --- | --- | --- |
| Incidence of Horizontal Line Spots |  | 44.44% | 29.17% | — |
| 1st Run | Few | 26.92% | 47.06% | — |
|  | Normal | 73.08% | 52.94% | — |
|  | Number of LCD | 26 | 17 | — |
| 2nd Run | Few | 23.40% | 25.00% | 36.00% |
|  | Normal | 76.60% | 75.00% | 64.00% |
|  | Number of LCD | 47 | 32 | 25 |

Referring to Table 2, the spots defection decrease as the content of the antioxidant increases. In the 1st run, when the content of the antioxidant increases from 50 ppm to 100 ppm, the ratio of "Few" increases from 26.92% to 47.06%. In the 2nd Run, when the content of the antioxidant increases from 50 ppm, 100 ppm, and 150 ppm, the ratio of "Few" increases 23.40%, 25.00%, and 36.00%.

9. Reduction of Afterimages with Respect to Content of Antioxidant

Table 3 shows the result of afterimages with respect to the content of the antioxidant.

In Table 3, the afterimages are measured by known method and each value represents a gray level when the afterimage appears. In addition, "standard (0 ppm)" in Table 3 is for the liquid crystal display employing a liquid crystal composition without the alkenyl liquid crystal and antioxidant. Others, i.e., 50 ppm, 100 ppm, and 150 ppm are for the liquid crystal display according to the present disclosure, which employs the first liquid crystal composition with the antioxidant of 50 ppm, 100 ppm, and 150 ppm, respectively. "N" in Table 3 denotes that no afterimages are shown.

TABLE 3

| Content of antioxidant | Number of Samples | Type of Afteriamges | Afterimages at 25° C. | | | Afterimages at 60° C. | | | |
|---|---|---|---|---|---|---|---|---|---|
| | | | 1 hr | 2.5 hr | 12 hr | 12 hr | 30 hr | 120 hr | 168 hr |
| Standard (0 ppm) | 2 | Surface afterimages | 49~55 | 58~71 | 110~133 (5.0~5.4) | — | — | — | 6.1~6.4 |
| | | Line afterimages | | | | N | N | N | |
| | | Black afterimages | N | N | N | N | N | N | |
| 50 ppm | 8 | Surface afterimages | 57~86 | 64~102 | 96~140 (4.7~6.0) | — | — | — | 4.7~7.8 |
| | | Line afterimages | | | | N | N | 32 | 32 |
| | | Black afterimages | N | N | N | N | N | N | N |
| 100 ppm | 4 | Surface afterimages | 0~75 | 50~89 | 97~138 (4.8~5.5) | — | — | — | 4.7~5.2 |
| | | Line afterimages | | | | N | N | 32 | 32 |
| | | Black afterimages | N | N | N | N | N | N | N |
| 150 ppm | 4 | Surface afterimages | 67~120 | 111~139 | 116~144 (4.6~5.3) | — | — | — | 5.1~6.0 |
| | | Line afterimages | | | | N | N | N | N |
| | | Black afterimages | N | N | N | N | N | N | N |

Referring to Table 3, the gray level becomes higher as the content of the antioxidant increases. Namely, the afterimages decrease as the content of the antioxidant increases.

10. Optical Property Changes with Respect to Content of Antioxidant

Table 4 shows the optical properties of the liquid crystal display with respect to the content of the antioxidant. Table 4 is for the liquid crystal display according to the present disclosure, which employs the first liquid crystal composition and 50 ppm, 100 ppm, and 150 ppm of the antioxidant, respectively.

The optical properties for the liquid crystal display according to the present disclosure are marked as a percentage (%) based on the value for the liquid crystal display employing a liquid crystal composition without antioxidant as a standard value.

TABLE 4

| | 1st Liquid Crystal Composition (50 ppm) | 1st Liquid Crystal Composition (100 ppm) | 1st Liquid Crystal Composition (150 ppm) |
|---|---|---|---|
| Contrast ratio | 105.70 | 94.13 | 99.98 |
| Brightness (white) | 95.93 | 96.57 | 97.40 |
| Uniformity (%) | 92.02 | 91.08 | 100 |
| Color Rx | 99.85 | 99.85 | 99.85 |
| Ry | 100 | 100 | 100 |
| Gx | 100 | 99.67 | 99.67 |
| Gy | 99.84 | 99.84 | 99.84 |
| Bx | 100 | 100 | 100 |
| By | 98.21 | 96.43 | 98.21 |
| Wx | 98.91 | 99.27 | 98.91 |
| Wy | 99.31 | 98.96 | 99.65 |
| Color gamut | 99.87 | 99.87 | 100.13 |
| Color Temp. | 104.44 | 103.91 | 103.27 |
| Gamma | 127.12 | 127.12 | 127.97 |
| Rising time (ms) | 82.67 | 82.09 | 84.65 |
| Falling time (ms) | 73.99 | 76.91 | 73.77 |
| Total response time | 79.71 | 80.32 | 80.93 |
| Transmittance | 96.12 | 95.79 | 97.41 |

In Table 4, the "rising time" and the "falling time" refer to the time for arranging the liquid crystal molecules in a specific direction according to the electric field and the time for restoration the liquid crystal molecules in an original direction, respectively.

Referring to Table 4, the optical properties of the present disclosure do not show much difference although different levels of the antioxidant are employed. Particularly, the color coordinates for the three liquid crystal displays are substantially on par with each other. In addition, the rising time and the falling time, which correspond to the response time of the liquid crystal molecules, have substantially the same value. This means that the content of the antioxidant does not affect the optical properties of the liquid crystal display.

11. Antioxidant and Derivatives of the Antioxidant

Table 5 shows the result of gas chromatography-mass spectrometry for the liquid crystal composition according to the present disclosure after UV irradiation. The liquid crystal composition of Table 5 has the reactive mesogens in the amount of 0.45 percent by weight relative to the total weight of the liquid crystal composition and the antioxidant of 50 ppm. For the gas chromatography-mass spectrometry GC-MS of Shimidzu is used. In Table 5, the liquid crystal 1 and 2 are non-cyclohexyl neutral liquid crystals. Here, there are not substantially different chromatographic and mass spectrometric values between an area where the defects occurs and an area where no defects occurs.

TABLE 5

| Retention time (m) | Materials | MW | 1st Run | | 2nd Run | | 3rd Run | | 4th Run | |
|---|---|---|---|---|---|---|---|---|---|---|
| | | | Area | Normalized Area (×100) | Area | Normalized Area (×100) | Area | Normalized Area (×100) | Area | Normalized Area (×100) |
| 18.524 | Liquid crystal 1 | ~220 | 73052 | 0.157 | 52599 | 0.142 | 61612 | 0.155 | 64202 | 0.174 |

TABLE 5-continued

| Retention time (m) | Materials | MW | 1st Run Area | 1st Run Normalized Area (×100) | 2nd Run Area | 2nd Run Normalized Area (×100) | 3rd Run Area | 3rd Run Normalized Area (×100) | 4th Run Area | 4th Run Normalized Area (×100) |
|---|---|---|---|---|---|---|---|---|---|---|
| 20.637 | Liquid crystal 2 | ~206 | 175441 | 0.378 | 148298 | 0.400 | 148293 | 0.373 | 142545 | 0.386 |
| 20.709 | Liquid Crystal 3 | 248 | 1610736 | 3.470 | 1300088 | 3.504 | 1413212 | 3.552 | 1248485 | 3.384 |
| 21.061 | Derivatives of aldehyde | 236 | 263222 | 0.567 | 156839 | 0.423 | 166416 | 0.418 | 131730 | 0.357 |
| 22.718 | Liquid crystal 4/Unknown 1 | 296/278 | 155671 | 0.335 | 109835 | 0.296 | 112613 | 0.283 | 88747 | 0.241 |
| 23.560 | Liquid crystal 5 | 310 | 568644 | 1.225 | 457430 | 1.233 | 489611 | 1.231 | 442670 | 1.200 |
| 25.374 | Antioxidant 1 | 330 | 109542 | 0.236 | 78367 | 0.211 | 117564 | 0.296 | 121929 | 0.330 |
| 27.155 | Antioxidant 2 | 294 | 267809 | 0.577 | 214562 | 0.578 | 103927 | 0.261 | 77828 | 0.211 |
| 29.404 | Unknown 2 | 310 | 134784 | 0.290 | 98999 | 0.267 | 103690 | 0.261 | 89587 | 0.243 |
| 30.992 | Reactive mesogens | 322 | 258375 | 0.557 | 176298 | 0.475 | 215734 | 0.542 | 201177 | 0.545 |
| 45.090 | Unknown 3 | 434 | 265057 | 0.571 | 189735 | 0.511 | 57955 | 0.146 | 41853 | 0.113 |
| 43.227 | Standard liquid crystal | 420 | 46412420 | | 37105974 | | 39783331 | | 36893991 | |

FIGS. 11A to 11E are mass spectrometry of the liquid crystal composition after UV irradiation. FIGS. 11A to 11E sequentially show the liquid crystal 1, the liquid crystal 2, the liquid crystal 4/unknown 1, the unknown 2, and the unknown 3 of Table 5. The x-axis of the mass spectrometry is m/z.

Figure 11A:
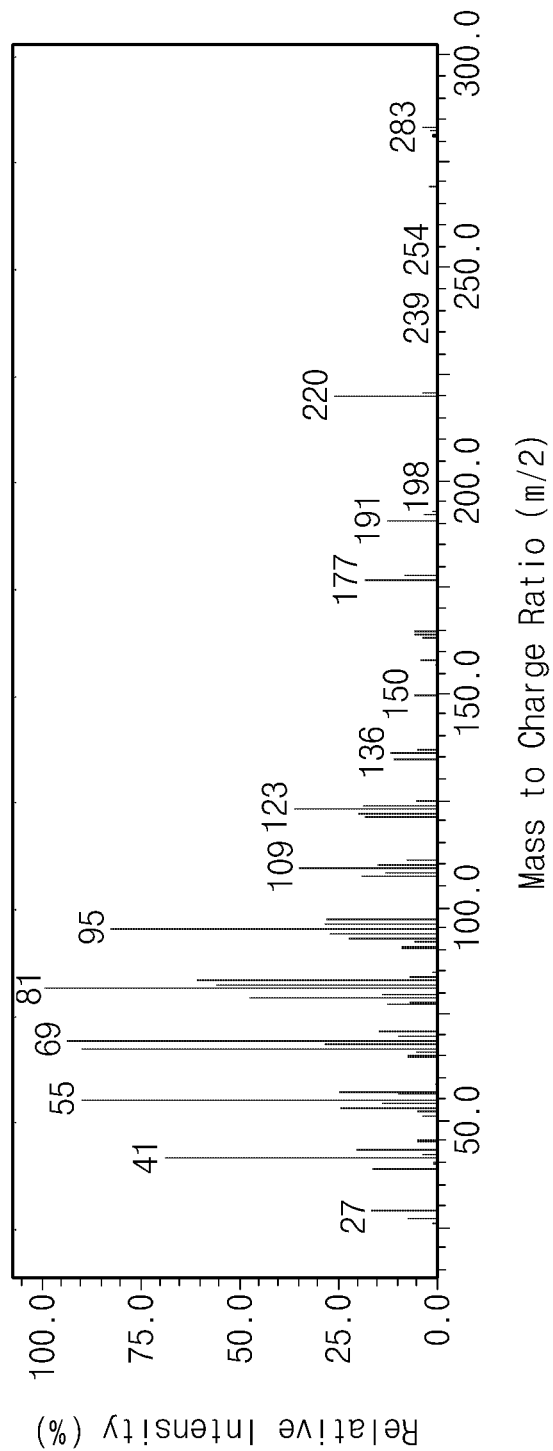
FIGS. 11A to 11E are graphs of relative intensity (%) versus mass to charge ratio (m/z) showing the results of mass spectrometry analysis of the liquid crystal compositions according to Table 5 after UV irradiation.
Figure 11B:
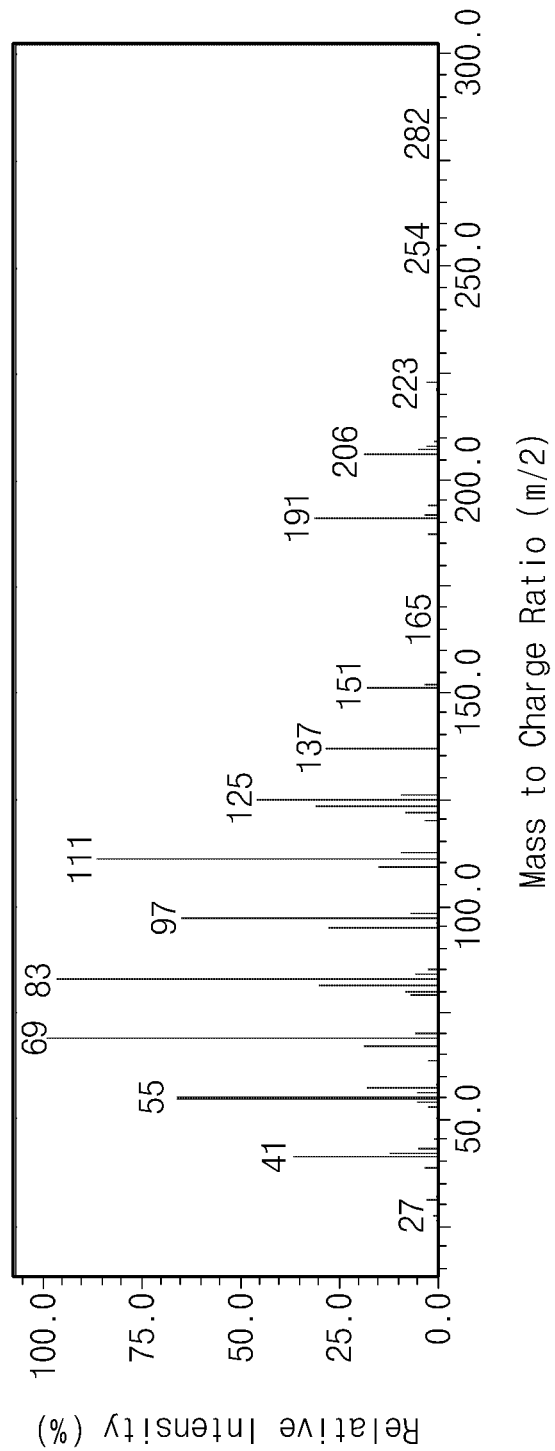
Figure 11C:
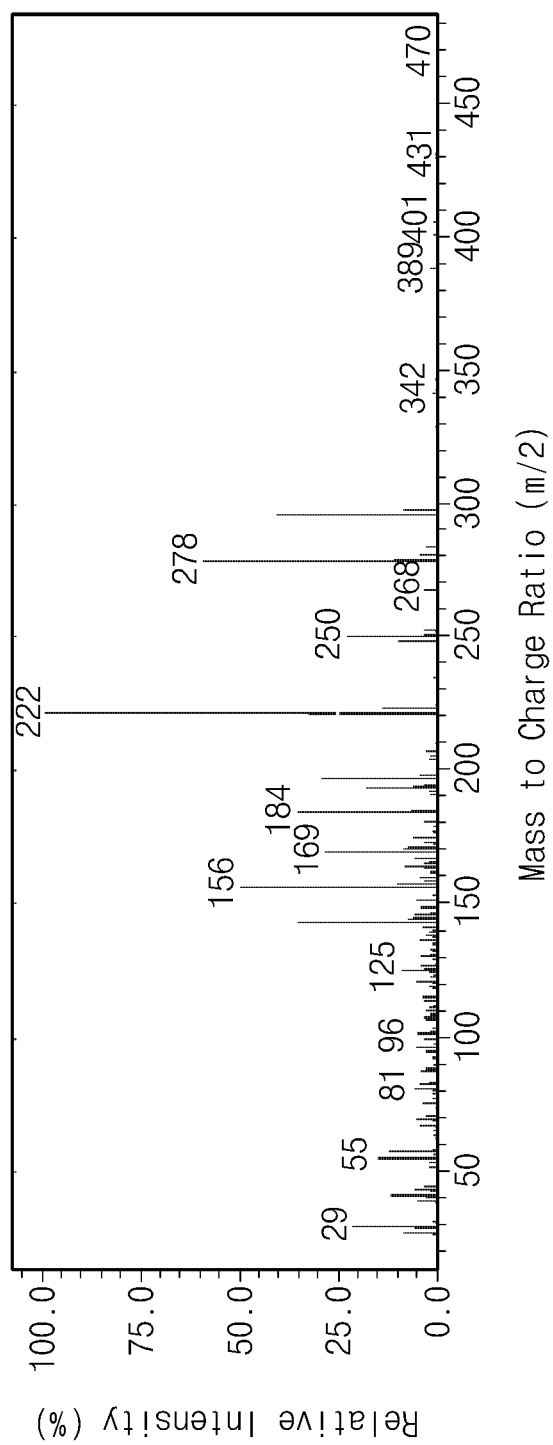
Figure 11D:
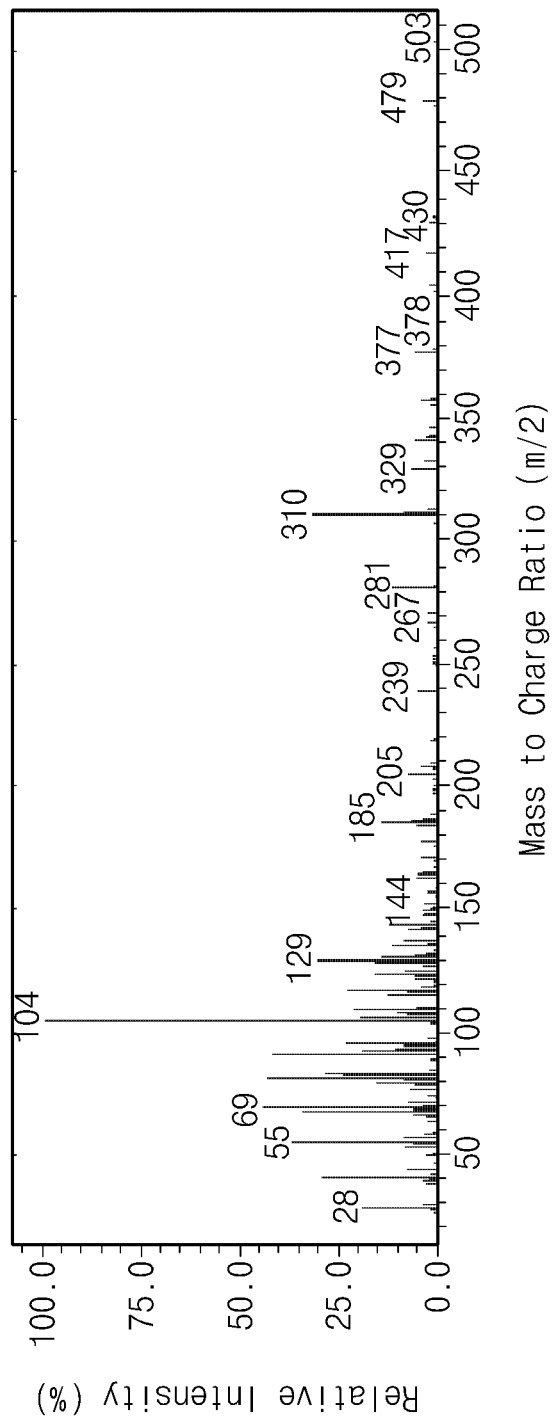
Figure 11E:
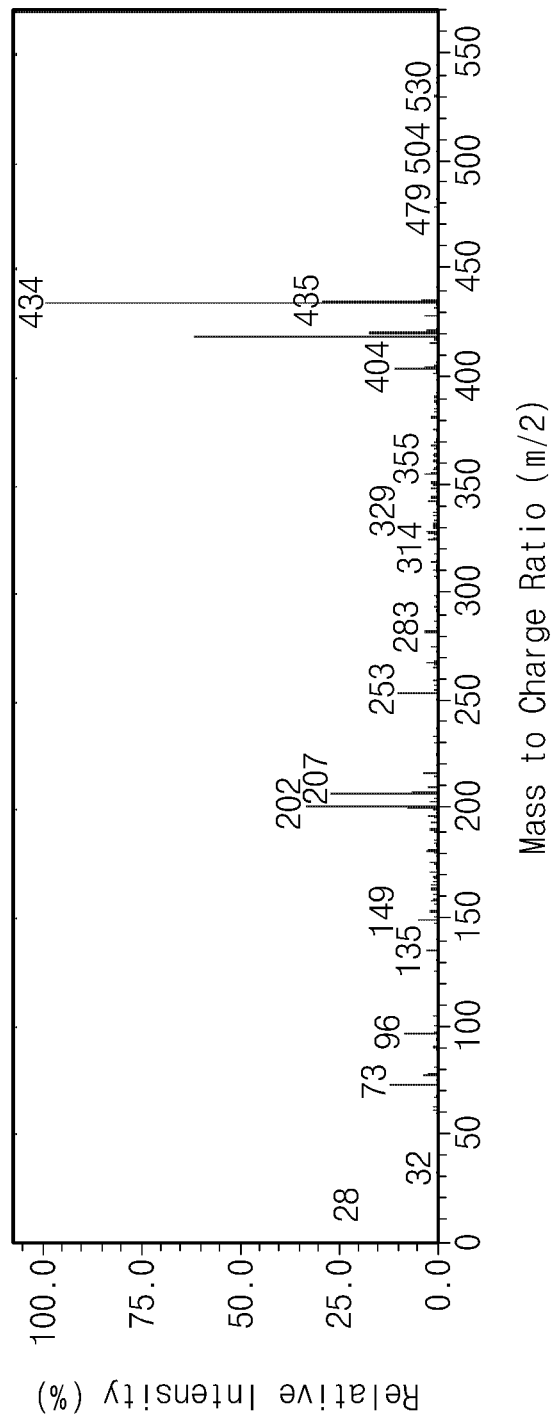

Referring to Table 5, and FIGS. 11A to 11E, materials having molecular weights of 330 and 294, which respectively correspond to the antioxidant 1 and the antioxidant 2, are analyzed, thereby it is estimated that the antioxidant remains in the liquid crystal composition even after UV irradiation. The material having molecular weight of 278 corresponding to the unknown 1 shows substantially the same retention time as that of the liquid crystal 4. Referring to FIG. 11C, which is the mass spectrometry for the liquid crystal 4/unknown 4, peaks corresponding to the fragments of the liquid crystal 4 of molecular weight of 296 and derivatives after reaction, such as, 156, 169, and 184 are shown. In addition, peaks corresponding to the fragments of the unknown 1, such as 222 and 250 are shown. Particularly, FIG. 11E, which is the mass spectrometry for the unknown 3, is understood that the spectrometry shows peaks corresponding to the derivatives of the antioxidant resulted from the reaction of the antioxidant and the liquid crystal molecules.

As described above, the resulting liquid crystal composition after UV irradiation includes the derivatives of the antioxidant and may have some antioxidant which has not reacted with other materials.

What is claimed is:

1. A liquid crystal display device comprising:
a first substrate;
a second substrate facing the first substrate; and
a liquid crystal layer between the first and second substrates,
wherein the liquid crystal layer comprises a liquid crystal composition comprising
a liquid crystal compound comprising an alkenyl group,
an antioxidant component comprising an antioxidant compound, and
a liquid crystal compound comprising an alkoxy group comprising at least one compound selected from

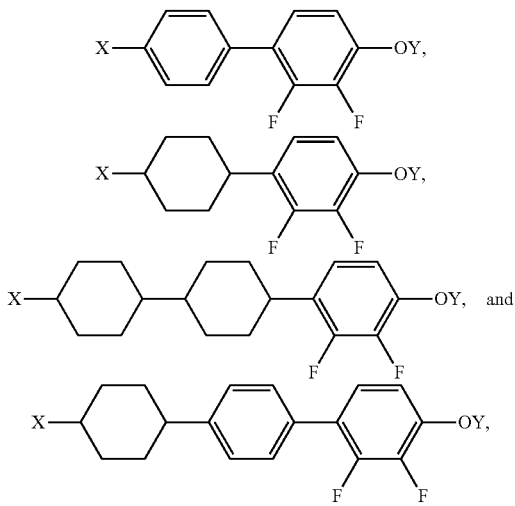

wherein each X and Y is independently an alkyl group having 1 to 5 carbon atoms, and
wherein the liquid crystal compound comprising the alkenyl group is present in an amount of about 20 percent by weight to about 60 percent by weight relative to the total weight of the liquid crystal composition, and the liquid crystal comprising an alkoxy group is present in an amount of greater than about 40 percent by weight and equal to or less than about 65 percent by weight, relative to the total weight of the liquid crystal composition.

2. The liquid crystal display device of claim 1, wherein the antioxidant component is present in an amount of greater than 0 parts per million and equal to or less than about 10,000 parts per million, relative to a total weight of the liquid crystal composition.

3. The liquid crystal display device of claim 1, wherein the liquid crystal compound comprising the alkenyl group comprises at least one compound selected from

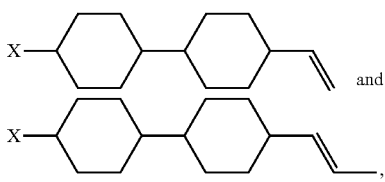

wherein each X is independently an alkyl group having 1 to 5 carbon atoms.

4. The liquid crystal display device of claim 1, wherein the liquid crystal composition further comprises a liquid crystal compound comprising a terphenyl group in an amount of greater than 0 percent by weight and equal to or less than about 15 percent by weight, relative to the total weight of the liquid crystal composition.

5. The liquid crystal display device of claim 4, wherein the liquid crystal compound comprising the terphenyl group comprises at least one compound represented by

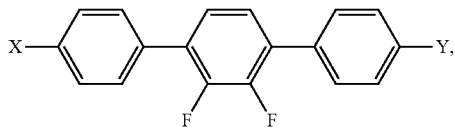

wherein each X and Y is independently an alkyl group having 1 to 5 carbon atoms.

6. The liquid crystal display device of claim 4, wherein the liquid crystal composition further comprises a liquid crystal compound comprising a quaterphenyl group in an amount of greater than 0 percent by weight to about 5 percent by weight relative to the total weight of the liquid crystal composition, the liquid crystal compound comprising a quaterphenyl group comprising at least one compound represented by

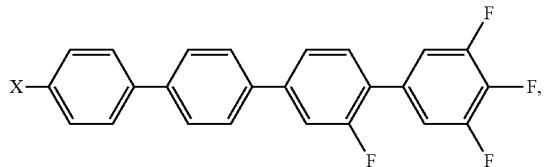

wherein X is an alkyl group having 1 to 5 carbon atoms.

7. The liquid crystal display device of claim 1, wherein the antioxidant compound is at least one compound selected from an alkylated monophenol, an alkylthiomethylphenol, a hydroquione, a tocopherol, a hydroxylated thiodiphenyl ether, an alkylidenebisphenol, an O-, N- and S-benzyl compound, a hydroxybenzylated malonate, an aromatic hydroxybenzyl compound, a triazine compound, a benzylphosphonate, an acylaminophenol, an ester of [3-(3,5-di-tert-butyl-4-hydroxyphenyl)propionic acid with a mono- or polyhydric alcohol, an ester of [3-(5-tert-butyl-4-hydroxy-3-methylphenyl)propionic acid with a mono- or polyhydric alcohol, an ester of [3-(3,5-dicyclohexyl-4-hydroxyphenyl)propionic acid with a mono- or polyhydric alcohol, an ester of 3,5-di-tert-butyl-4-hydroxyphenyl acetic acid with a mono- or polyhydric alcohol, an amide of [3-(3,5-di-tert-butyl-4-hydroxyphenyl)propionic acid, ascorbic acid, and an aminic antioxidant.

8. The liquid crystal display device of claim 1, wherein the antioxidant compound is at least one compound selected from 2,2'-thiodiethylene bis[3-(3,5-di-t-butyl-4-hydroxyphenyl) propionate], 1,3,5-trimethyl-2,4,6-tris(3,5-di-tert-4-hydroxybenzyl)benzene, a C13-C15 alkyl ester of 3,5-bis(1,1-dimethylethyl)-4-hydroxy-benzenepropanoic acid, a C13-C15 alkyl ester of 3,5-bis(1,1-dimethylethyl)-4-hydroxy-benzenepropanoic acid, 1,3,5-tris(4-tert.-butyl-3-hydroxy-2,6-dimethylbenzyl)-1,3,5-triazine-2,4,6-(1H,3H,5H)-trione, 2,2'-methylenebis(6-t-butyl-4-methylphenol), 1,1-bis(2-methyl-4-hydroxy-5-tert-butylphenyl)butane, 1,1,3-tris(2'-methyl-4'-hydroxy-5'-t-butylphenyl)butane, a butylated reaction product of p-cresol and dicyclopentadiene, triethyleneglycolbis[3-(3-t-butyl-4-hydroxy-5-methylphenyl)propionate], N,N'-hexamethylene bis[3-(3,5-di-t-butyl-4-hydroxyphenyl) propionamide, 2,2'-thiobis(6-t-butyl-4-methylphenol), F2,2'methylenebis[4-methyl-6-(1-methyl-cyclohexyl)phenol], and 2,2'-methylenebis(6-nonyl-p-cresol).

9. The liquid crystal display device of claim 1, further comprising a first alignment layer between the first substrate and the liquid crystal layer and a second alignment layer between the second substrate and the liquid crystal layer,
wherein each of the first and second alignment layers comprises a polymerized reactive mesogen.

10. The liquid crystal display device of claim 9, wherein the polymerized reactive mesogen is present in an amount of greater than 0 percent by weight to about 30 percent by weight, relative to a total weight of the liquid crystal composition.

11. A method of manufacturing a liquid crystal display device comprising:
providing a first substrate;
providing a second substrate;
disposing a liquid crystal composition between the first and second substrates, the liquid crystal composition comprising a liquid crystal compound comprising an alkenyl group, an antioxidant component comprising an antioxidant compound, and reactive mesogens; and
providing light to the liquid crystal composition to form first and second alignment forming layers on the first and second substrates, respectively,
wherein the liquid crystal composition comprises
a liquid crystal compound comprising an alkenyl group,
an antioxidant component comprising an antioxidant compound, and
a liquid crystal compound comprising an alkoxy group comprising at least one compound selected from

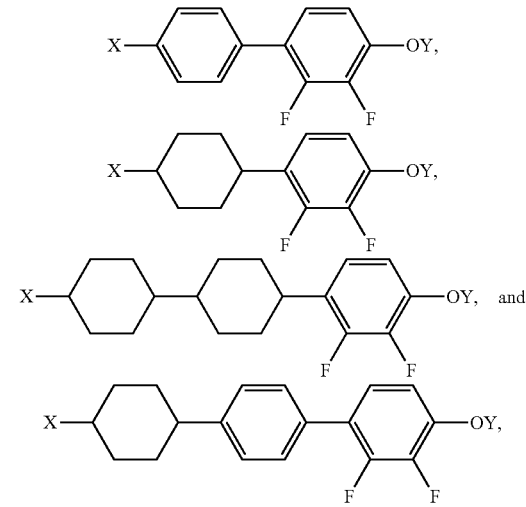

wherein each X and Y is independently an alkyl group having 1 to 5 carbon atoms, and wherein the liquid crystal compound comprising the alkenyl group is present in an amount of about 20 percent by weight to about 60 percent by weight relative to the total weight of the liquid crystal composition, and the liquid crystal comprising an alkoxy group is present in an amount of greater than about 40 percent by weight and equal to or less than about 65 percent by weight, relative to the total weight of the liquid crystal composition.

12. The method of claim 11, wherein the liquid crystal composition comprises the antioxidant component in an amount of greater than 0 parts per million and equal to or less than about 10,000 parts per million, relative to a total weight of the liquid crystal composition.

13. The method of claim 12, wherein the antioxidant compound is at least one compound selected from an alkylated monophenol, an alkylthiomethylphenol, a hydroquinone, an alkylated hydroquinone, a tocopherol, a hydroxylated thiodiphenyl ether, an alkylidenebisphenol, an O-, N- and S-benzyl compound, a hydroxybenzylated malonate, an aromatic hydroxybenzyl compound, a triazine compound, a benzylphosphonate, an acylaminophenol, an ester of [3-(3,5-di-tert-butyl-4-hydroxyphenyl)propionic acid with a mono- or polyhydric alcohol, an ester of [3-(5-tert-butyl-4-hydroxy-3-methylphenyl)propionic acid with a mono- or polyhydric alcohol, an ester of [3-(3,5-dicyclohexyl-4-hydroxyphenyl) propionic acid with a mono- or polyhydric alcohol, an ester of 3,5-di-tert-butyl-4-hydroxyphenyl acetic acid with a mono- or polyhydric alcohol, an amide of [3-(3,5-di-tert-butyl-4-hydroxyphenyl)propionic acid, ascorbic acid, and an aminic antioxidant.

14. The method of claim 11, wherein the liquid crystal compound comprising an alkenyl group comprises at least one compound selected from

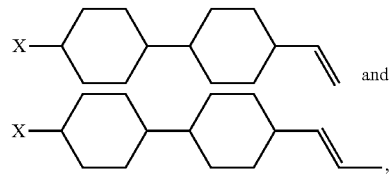

and

, wherein each X is independently an alkyl group having 1 to 5 carbon atoms.

15. The method of claim 11, further comprising applying an electric field to the liquid crystal composition by an electrode part on at least one of the first and second substrates when providing light to the liquid crystal composition.

16. The method of claim 11, wherein the liquid crystal composition further comprises a liquid crystal compound comprising a terphenyl group in an amount of greater than 0 percent by weight and equal to or less than about 15 percent by weight, relative to a total weight of the liquid crystal composition.

17. The method of claim 16, wherein the liquid crystal composition further comprises a liquid crystal compound comprising a quaterphenyl group in an amount of greater than 0 percent by weight to about 5 percent, by weight relative to the total weight of the liquid crystal composition.

18. The method of claim 11, wherein the reactive mesogens are present in an amount of greater than 0 percent by weight to about 30 percent by weight, relative to a total weight of the liquid crystal composition.

* * * * *